US008095913B2

(12) United States Patent  (10) Patent No.: US 8,095,913 B2
Kodaka et al.  (45) Date of Patent: Jan. 10, 2012

(54) COMPUTER READABLE STORAGE MEDIUM THAT STORES A TEST SPECIFICATIONS CREATING PROGRAM, TEST SPECIFICATIONS CREATING APPARATUS AND TEST SPECIFICATIONS CREATING METHOD

(75) Inventors: Toshihiro Kodaka, Kawasaki (JP); Rieko Yamamoto, Kawasaki (JP); Tadahiro Uehara, Kawasaki (JP); Asako Katayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 845 days.

(21) Appl. No.: 12/048,828

(22) Filed: Mar. 14, 2008

(65) Prior Publication Data
US 2009/0055801 A1   Feb. 26, 2009

(30) Foreign Application Priority Data
Mar. 27, 2007 (JP) .................................. 2007-081615

(51) Int. Cl.
*G06F 9/44* (2006.01)
(52) U.S. Cl. ....................................................... 717/124
(58) Field of Classification Search ........... 717/123–125
See application file for complete search history.

(56) References Cited

U.S. PATENT DOCUMENTS
| 2002/0174414 A1* | 11/2002 | Matsuo et al. ................. 717/126 |
| 2004/0268312 A1* | 12/2004 | Abe et al. ....................... 717/124 |
| 2005/0138426 A1* | 6/2005 | Styslinger ....................... 713/201 |
| 2005/0149868 A1* | 7/2005 | Katayama et al. ............. 715/700 |

FOREIGN PATENT DOCUMENTS
JP   2005-266954   9/2005

OTHER PUBLICATIONS

The Apache Software Foundation, "Apache Jakarta Project CACTUS The throrn in your bug's side Docs for: v1.7.2/v1.7.1 Last update: Mar. 26, 2006," [Retrieved on Oct. 10, 2006] Retrieved from the Internet: <URL: http://jakarta.apache.org/cactus/how_it_works.html>(6 pages).
Russell Gold, "HttpUnit," [Retrieved on Oct. 10, 2006] Retrieved from the Internet: <http://httpunit.sourceforge.net/doc/cookbook.html> (4 pages).
Japanese Office Action issued Sep. 13, 2011 in counterpart Japanese Patent Application No. 2007-081615 (4 pages) (2 pages English Translation).

* cited by examiner

*Primary Examiner* — Anna Deng
(74) *Attorney, Agent, or Firm* — Staas & Halsey LLP

(57) ABSTRACT

Providing test specification for testing a Web application by receiving unfinished test specifications data describing a series of screen transition specifications included in a test case for a Web application to be installed in a Web server, obtaining a response including an output item, which can be obtained as a result of execution of the Web application, by giving a request that requests a Web screen based on the screen transition specifications selected from the series of screen transition specifications to the Web application. Then, an expected value for the screen transition specifications is extracted from the response based on the output item included in the obtained response and the extracted expected value is written to the received unfinished test specifications data in connection with the screen transition specifications.

9 Claims, 24 Drawing Sheets

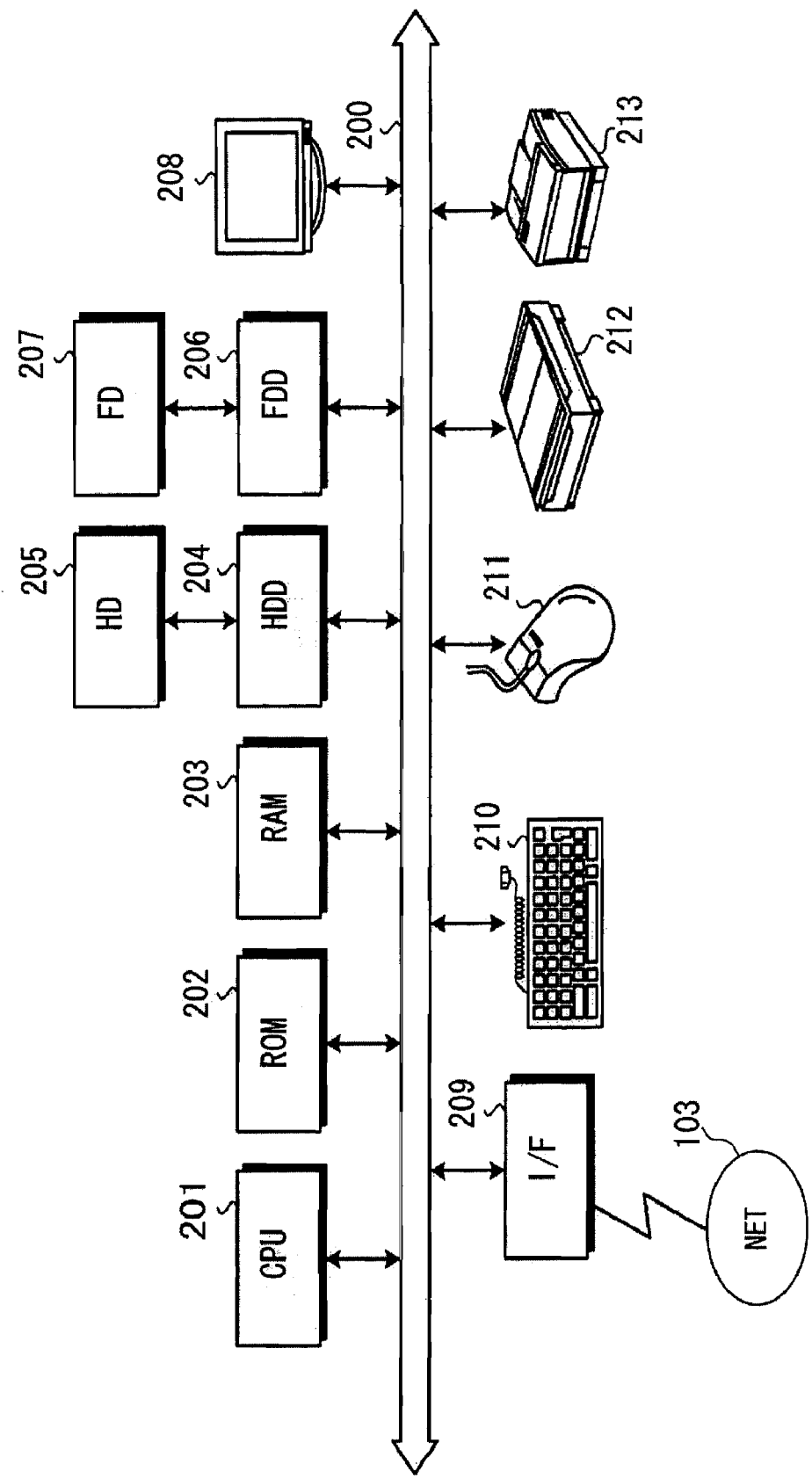

| TEST CASE TCi | SCREEN TRANSITION SPECIFICATION | | EXPECTED VALUE INFORMATION | | | |
|---|---|---|---|---|---|---|
| | NAME OF SCREEN | OPERATIONAL STEP DESCRIPTION | META INFORMATION | | NUMBER OF CALLS | EXPECTED VALUE |
| | | | TAG CLASS | ATTRIBUTE | | |
| TC1 | JSP1 | ENTER "KUME" INTO INPUT FIELD AND PRESS SEARCH BUTTON | | | | |
| | JSP2 | CLICK "TARO KUMETA | | | | |
| | JSP3 | EXIT | | | | |
| TC2 | JSP1 | (ENTER NOTHING INTO INPUT FIELD AND PRESS SEARCH BUTTON) | | | | |
| | JSP4 | EXIT | | | | |

110

BUSINESS LOGIC CLASS 526

```
22  public class AddAction extends Action {
24    /*Performs the simple action */
32    @Override
33    public NotionForward execute(Not onMapping mapping, NotionForm set on Form, HttpServletRequest request, HttpServletResponse response) throws IOException,
34        ServletException {
35      if (actionform instanceof AddForm) {
36        AddForm form = (AddForm) actionForm
37        int param1 = integer.parseInt(form getParam1));
38        int param2 = integer.parseInt(form getParam2));
39        int result = param1 + param2;
40        form setResult ("" - result);
41      }
42      return (mapping.findForward("success"));
43    }
44  }
```

CALCULATE/REGISTER OUTPUT ITEM

— 527

```
1  <%@ page contentType="text/html; charset = vtf-8" %>
2
3  <%@ taglib uri="/WEB-INF/tld/struts-bean-1.1.tld" prefix="bean" %>
4  <%@ taglib uri="/WEB-INF/tld/struts-html-1.1.tld" prefix="html" %>
5  <%@ taglib uri="/WEB-INF/tld/struts-logic-1.1.tld" prefix="logic" %>
6
7  <html:html xhtml ="true">
8  <head><html:base/><title>Result</title></head>
9  <body>
10    <p>The result is <bean:write name="AddForm" property="result"/></p>
11  </body>
12 </html:html>
```

UPON TEST →

META INFORMATION INSERTION ENGINE 920

SELECT OUTPUT POSITION OF OUTPUT ITEM

META INFORMATION IS OUTPUT AS COMMENT BEFORE AND AFTER OUTPUT POSITION

```
1  <html>
2  <head><title>Result</title></head>
3  <br><br>
4  <body>
5    <p>The result is <!--testStart class="WriteTag" name="AddForm" property="result"-->5<!--testEnd--></p>
6  </body>
7  </html>
```

| TEST CASE TCi | SCREEN TRANSITION SPECIFICATION | | EXPECTED VALUE INFORMATION | | | |
|---|---|---|---|---|---|---|
| | NAME OF SCREEN | OPERATIONAL STEP DESCRIPTION | META INFORMATION | | NUMBER OF CALLS | EXPECTED VALUE |
| | | | TAG CLASS | ATTRIBUTE | | |
| TC1 | JSP1 | ENTER "KUME" INTO INPUT FIELD AND PRESS SEARCH BUTTON | WriteTag | ... | 1 | ... |
| | | | InputTag | ... | 1 | ... |
| | | | ... | ... | ... | ... |
| | JSP2 | CLICK "TARO KUMETA" | WriteTag | property="numHit" | 1 | 2 |
| | | | WriteTag | property="minHit" | 1 | 1 |
| | | | WriteTag | property="maxHit" | 1 | 2 |
| | | | WriteTag | property="pageNum" | 1 | 1 |
| | | | WriteTag | property="name" | 1 | TARO KUMETA |
| | | | WriteTag | property="kana" | 1 | TARO KUMETA |
| | | | WriteTag | property="affiliation" | 1 | BB |
| | | | WriteTag | property="external" | 1 | 1234-5679 |
| | | | WriteTag | property="presence" | 1 | IN OFFICE |
| | | | WriteTag | property="name" | 2 | TERUNOBU KUME |
| | | | WriteTag | property="kana" | 2 | TERUNOBU KUME |
| | | | WriteTag | property="affiliation" | 2 | AA |
| | | | WriteTag | property="external" | 2 | 1234-5678 |
| | | | WriteTag | property="presence" | 2 | ON BUSINESS TRIP |
| | | | WriteTag | property="pageNum" | 2 | 1 |
| | JSP3 | EXIT | | | | |
| TC2 | JSP1 | (ENTER NOTHING INTO INPUT FIELD AND PRESS SEARCH BUTTON) | | | | |
| | JSP4 | EXIT | | | | |

110

1400 (TAG CLASS, ATTRIBUTE)

1500 (NUMBER OF CALLS, EXPECTED VALUE)

FIG16

SEARCH RESULT

NAME　　NAME IN KANA　　BIRTHDAY　　ADDRESS

TARO KUMETA　TARO KUMETA　　～　　　　～

3

| TEST CASE TCi | SCREEN TRANSITIONAL SPECIFICATION | | EXPECTED VALUE INFORMATION | | | |
|---|---|---|---|---|---|---|
| | NAME OF SCREEN | OPERATIONAL STEP DESCRIPTION | META INFORMATION | | NUMBER OF CALLS | EXPECTED VALUE |
| | | | TAG CLASS | ATTRIBUTE | | |
| TC1 | JSP1 | ENTER "KUME" INTO INPUT FIELD AND PRESS SEARCH BUTTON | WRITE TAG | | 1 | ... |
| | | | INPUT TAG | | 1 | ... |
| | | | ... | ... | ... | ... |
| | | | WRITE TAG | property ="numHit" | 1 | 2 |
| | | | WRITE TAG | property ="minHit" | 1 | 1 |
| | | | WRITE TAG | property ="maxHit" | 1 | 2 |
| | | | WRITE TAG | property ="pageNum" | 1 | 1 |
| | JSP2 | CLICK "TARO KUMETA" | WRITE TAG | property ="name" | 1 | TARO KUMETA |
| | | | WRITE TAG | property ="kana" | 1 | TARO KUMETA |
| | | | WRITE TAG | property ="affiliation" | 1 | BB |
| | | | WRITE TAG | property ="external" | 1 | 1234-5679 |
| | | | WRITE TAG | property ="presence" | 1 | IN OFFICE |
| | | | WRITE TAG | property ="name" | 2 | TERUNOBU KUME |
| | | | WRITE TAG | property ="kana" | 2 | TERUNOBU KUME |
| | | | WRITE TAG | property ="affiliation" | 2 | AA |
| | | | WRITE TAG | property ="external" | 2 | 1234-5678 |
| | | | WRITE TAG | property ="presence" | 2 | ON BUSINESS TRIP |
| | | | WRITE TAG | property ="pageNum" | 2 | 1 |
| | JSP3 | EXIT | WRITE TAG | property ="name" | 3 | TARO KUMETA |
| | | | WRITE TAG | property ="kana" | 3 | TARO KUMETA |
| | | | | ... | ... | ... |
| TC2 | JSP1 | (ENTER NOTHING INTO INPUT FIELD AND PRESS SEARCH BUTTON) | | | | |
| | JSP4 | EXIT | | | | |

FIG. 17

| TEST CASE TCi | SCREEN TRANSITION SPECIFICATION | | EXPECTED VALUE INFORMATION | | | | |
|---|---|---|---|---|---|---|---|
| | NAME OF SCREEN | OPERATIONAL STEP DESCRIPTION | META INFORMATION | | | NUMBER OF CALLS | EXPECTED VALUE |
| | | | TAG CLASS | ATTRIBUTE | | | |
| TC1 | JSP1 | ENTER "KUME" INTO INPUT FIELD AND PRESS SEARCH BUTTON | WRITE TAG | | | | ... |
| | | | INPUT TAG | | | | ... |
| | | | ... | ... | | ... | ... |
| | | | WRITE TAG | property ="numHit" | | 1 | 2 |
| | | | WRITE TAG | property ="minHit" | | 1 | 1 |
| | | | WRITE TAG | property ="maxHit" | | 1 | 2 |
| | | | WRITE TAG | property ="pageNum" | | 1 | 1 |
| | | | WRITE TAG | property ="name" | | 1 | TARO KUMETA |
| | | | WRITE TAG | property ="kana" | | 1 | TARO KUMETA |
| | | | WRITE TAG | property ="affiliation" | | 1 | BB |
| | | | WRITE TAG | property ="external" | | 1 | 1234-5679 |
| | | | WRITE TAG | property ="presence" | | 1 | IN OFFICE |
| | JSP2 | CLICK "TARO KUMETA" | WRITE TAG | property ="name" | | 2 | TERUNOBU KUME |
| | | | WRITE TAG | property ="kana" | | 2 | TERUNOBU KUME |
| | | | WRITE TAG | property ="affiliation" | | 2 | AA |
| | | | WRITE TAG | property ="external" | | 2 | 1234-5678 |
| | | | WRITE TAG | property ="presence" | | 2 | ON BUSINESS TRIP |
| | | | WRITE TAG | property ="pageNum" | | 2 | 1 |
| | JSP3 | EXIT | WRITE TAG | property ="name" | | 3 | TARO KUMETA |
| | | | WRITE TAG | property ="kana" | | 3 | TARO KUMETA |
| TC2 | JSP1 | (ENTER NOTHING INTO INPUT FIELD AND PRESS SEARCH BUTTON) | WRITE TAG | ... | | 1 | ... |
| | | | INPUT TAG | ... | | 1 | ... |
| | JSP4 | EXIT | WRITE TAG | property="NG" | | 1 | ENTER KEYWORDS |
| | | | ... | ... | | ... | ... |

FIG. 18

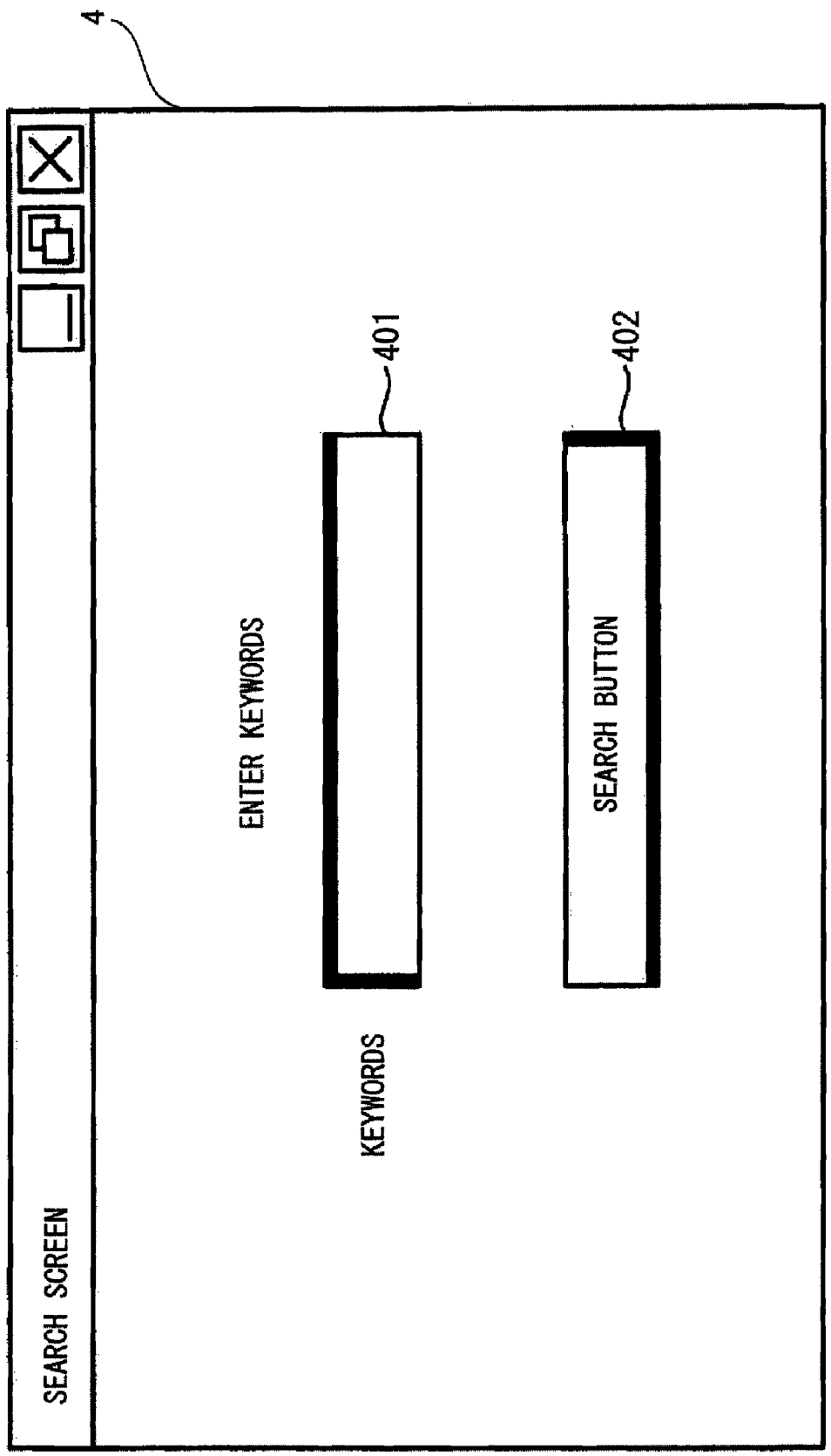

| TEST CASE | SCREEN TRANSITIONAL SPECIFICATION | | EXPECTED VALUE INFORMATION | | | |
|---|---|---|---|---|---|---|
| | NAME OF SCREEN | OPERATIONAL STEP DESCRIPTION | META INFORMATION | | NUMBER OF CALLS | EXPECTED VALUE |
| | | | TAG CLASS | ATTRIBUTE | | |
| TC1 | JSP1 | ENTER "KUME" INTO INPUT FIELD AND PRESS SEARCH BUTTON | WRITE TAG | ... | 1 | ... |
| | | | INPUT TAG | ... | 1 | ... |
| | | | ... | ... | ... | ... |
| | | | WRITE TAG | property="numHit" | 1 | 2 |
| | | | WRITE TAG | property="minHit" | 1 | 1 |
| | | | WRITE TAG | property="maxHit" | 1 | 2 |
| | | | WRITE TAG | property="pageNum" | 1 | 1 |
| | | | WRITE TAG | property="name" | 1 | TARO KUMETA |
| | | | WRITE TAG | property="kana" | 1 | TARO KUMETA |
| | | | WRITE TAG | property="affiliation" | 1 | BB |
| | | | WRITE TAG | property="external" | 1 | 1234-5679 |
| | | | WRITE TAG | property="presence" | 1 | IN OFFICE |
| | | | WRITE TAG | property="name" | 2 | TERUNOBU KUME |
| | | | WRITE TAG | property="kana" | 2 | TERUNOBU KUME |
| | | | WRITE TAG | property="affiliation" | 2 | AA |
| | | | WRITE TAG | property="external" | 2 | 1234-5678 |
| | | | WRITE TAG | property="presence" | 2 | ON BUSINESS TRIP |
| | | | WRITE TAG | property="pageNum" | 2 | 1 |
| | JSP2 | CLICK "TARO KUMETA" | WRITE TAG | property="name" | 3 | TARO KUMETA |
| | | | WRITE TAG | property="kana" | 3 | TARO KUMETA |
| | | | ... | ... | ... | ... |
| | JSP3 | EXIT | | | | |
| TC2 | JSP1 | (ENTER NOTHING INTO INPUT FIELD AND PRESS SEARCH BUTTON) | WRITE TAG | | 1 | ... |
| | | | INPUT TAG | | 1 | ... |
| | JSP4 | EXIT | WRITE TAG | property="NG" | 1 | ENTER KEYWORDS |
| TC3 | JSP1 | ENTER "KUMETA" INTO INPUT FIELD AND PRESS SEARCH BUTTON | | | | |
| | JSP5 | CLICK "TARO KUMETA" | | | | |
| | JSP3 | EXIT | | | | |

FIG. 20

| TEST CASE TCi | SCREEN TRANSITIONAL SPECIFICATION | | EXPECTED VALUE INFORMATION | | | | |
|---|---|---|---|---|---|---|---|
| | NAME OF SCREEN | OPERATIONAL STEP DESCRIPTION | META INFORMATION | | | NUMBER OF CALLS | EXPECTED VALUE |
| | | | TAG CLASS | ATTRIBUTE | | | |
| TC1 | JSP1 | ENTER "KUME" INTO INPUT FIELD AND PRESS SEARCH BUTTON | WRITE TAG | ... | | 1 | ... |
| | | | INPUT TAG | ... | | 1 | ... |
| | | | ... | ... | | ... | ... |
| | | | WRITE TAG | property = "numHit" | | 1 | 2 |
| | | | WRITE TAG | property = "minHit" | | 1 | 1 |
| | | | WRITE TAG | property = "maxHit" | | 1 | 2 |
| | JSP2 | CLICK "TARO KUMETA" | WRITE TAG | property = "pageNum" | | 1 | |
| | | | WRITE TAG | property = "name" | | 1 | TARO KUMETA |
| | | | WRITE TAG | property = "kana" | | 1 | TARO KUMETA |
| | | | WRITE TAG | property = "affiliation" | | 1 | BB |
| | | | WRITE TAG | property = "external" | | 1 | 1234-5679 |
| | | | WRITE TAG | property = "presence" | | 1 | IN OFFICE |
| | | | WRITE TAG | property = "name" | | 2 | TERUNOBU KUME |
| | | | WRITE TAG | property = "kana" | | 2 | TERUNOBU KUME |
| | | | WRITE TAG | property = "affiliation" | | 2 | AA |
| | | | WRITE TAG | property = "external" | | 2 | 1234-5678 |
| | | | WRITE TAG | property = "presence" | | 2 | ON BUSINESS TRIP |
| | | | WRITE TAG | property = "pageNum" | | 2 | 1 |
| | JSP3 | EXIT | WRITE TAG | property = "name" | | 3 | TARO KUMETA |
| | | | WRITE TAG | property = "kana" | | 3 | TARO KUMETA |
| | | | ... | ... | | ... | ... |
| TC2 | JSP1 | (ENTER NOTHING INTO INPUT FIELD AND PRESS SEARCH BUTTON) | WRITE TAG | | | 1 | ... |
| | | | INPUT TAG | | | 1 | ... |
| | JSP4 | EXIT | WRITE TAG | property = "NG" | | 1 | ENTER KEYWORDS |

COMPUTER READABLE STORAGE MEDIUM THAT STORES A TEST SPECIFICATIONS CREATING PROGRAM, TEST SPECIFICATIONS CREATING APPARATUS AND TEST SPECIFICATIONS CREATING METHOD

CROSS-REFERENCE TO RELATED APPLICATIONS

This application is related to and claims priority to Japanese patent application no. 2007-81615 filed on Mar. 27, 2007 in the Japan Patent Office, and incorporated by reference herein.

BACKGROUND

1. Field

The embodiments relate to a computer readable storage medium that stores a test specifications creating program, test specifications creating apparatus and test specifications creating method, which create test specifications data for use in a test on a developed Web application.

SUMMARY

According to an aspect of an embodiment, a computer readable storage medium that stores a test specifications creating program causing a computer to execute operations including receiving unfinished test specifications data describing a series of screen transition specifications included in a test case for an Web application to be installed in a Web server; obtaining a response including an output item, which can be obtained as an result of the execution of the Web application, by giving a request that requests a Web screen based on the screen transition specifications selected from the series of screen transition specifications to the Web application; extracting an expected value for the screen transition specifications from the response based on the output item included in the obtained response; and writing the extracted expected value to the received test specifications data in connection with the screen transition specifications.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a block diagram showing a hardware configuration of the computer machine shown in FIG. 1;

FIGS. 9-1 and 9-2 are diagrams of processing transitions in the Web application execution processing by the Web server;

FIG. 11 is an explanatory diagram showing a result of the execution of a Web application;

FIG. 15 is an explanatory diagram showing the test specifications data after expected value information is written on a Web screen JSP2;

FIG. 16 is an explanatory diagram showing an example of a Web screen JSP3;

FIG. 17 is an explanatory diagram showing the test specifications data after expected value information is written on the Web screen JSP3;

FIG. 18 is an explanatory diagram showing the test specifications data after expected value information is written for a test case TC2;

FIG. 19 is an explanatory diagram showing an example of a Web screen JSP4;

FIG. 20 is an explanatory diagram showing test specifications data further including screen transition specifications for a new test case TC3;

FIGS. 22A and 22B are explanatory diagrams showing test specification data after expected value information is written for the test case TC3.

DETAILED DESCRIPTION OF THE PREFERRED EMBODIMENTS

Figure 1:
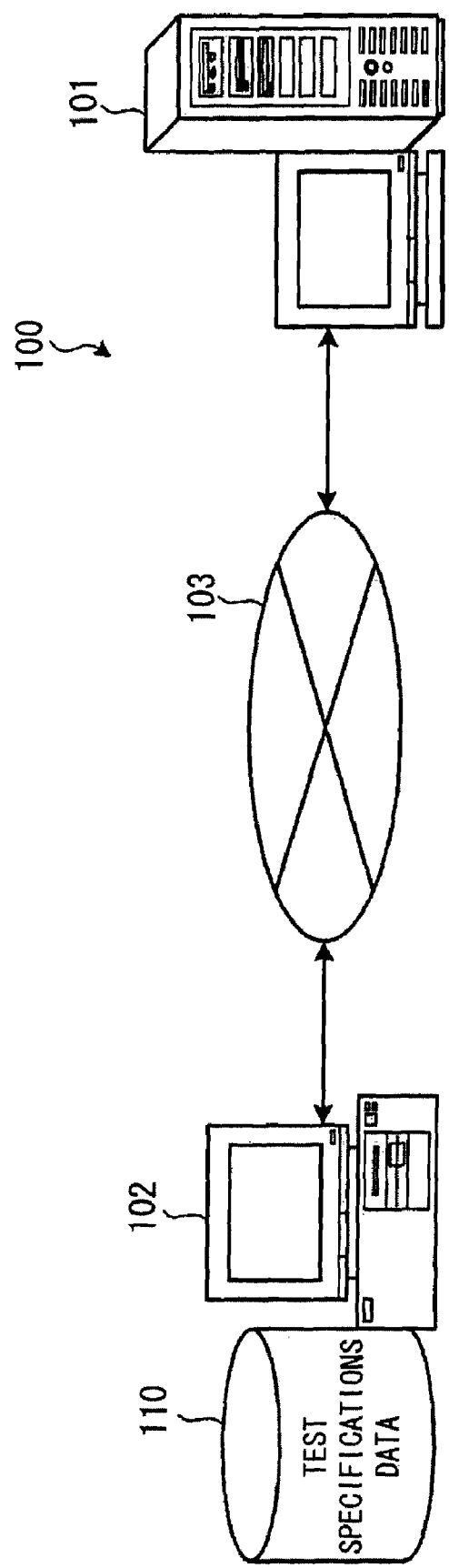
FIG. 1 is an explanatory diagram showing a schematic configuration of a test specifications creating system according to an embodiment.

A general method for recent Web application development is to separate a design function using a template file, such as (without limitation) a JAVA sever page (JSP) file, from a business logic function. The business logic is a logical description of a Web application that performs operational processing such as a business transaction and may be a logical description that defines respective business flows such as "Check the inventory and notify the result when a customer puts an article into a shopping cart" and "Connect to the card company for authentication when the transmission button is pressed". An output item processed within the business logic is configured to be displayed at the position specified by a custom tag within a JSP file.

A test on such a Web application generally adopts a method that checks whether the Web application operates accurately by repeatedly performing an operation on a Web browser. Conventional test specifications to be used for the test generally include test data as follows:

(1) screen operations and screen transitions
(2) input values to be input by a test practitioner on screens (screen input test data),
(3) expected output values on information to be output to screens (screen output test data),
(4) the initial state of a database, and
(5) expected values upon exit from the database.

Though the test data (2) to (5) may be omitted sometimes, description as much detailed as possible is desirable for keeping the quality in order to eliminate ambiguity in a test. In order to create the test data (2) and (3) relating to screens, an input value and an expected value to be output are defined for each input item and output item on a screen.

For example, in a Web application that outputs an address and/or a telephone number based on an input name, an item such as a name, and items such as an address and a telephone number, are extracted as input information (test data (2)) and expected output values (test data (3)), respectively, and an input value and expected output values are defined for each of the items.

Multiple records are managed as expected output values if there are plural persons who share the name. The input value and expected output values can be extracted from design information in functional specifications, for example, as information on the presence of repetitions for supporting item names and multiple records. However, a creator of the test specifications must input specific values manually.

Accordingly, a method has been proposed that automatically creates test specifications by executing a developed Web application and recording the inputs/outputs as a result of the execution of a test program (see, for example, Jakarta Cactus, [online], [retrieved on Oct. 10, 2006], Retrieve from the Internet: <URL: http://jakarta.apache.org/cactus>; and HttpUnit, [online], [retrieved on Oct. 10, 2006], Retrieved from the Internet: <URL: http://httpunit.sourceforge.net/>; and JP-A-2005-266954).

This method creates an HTTP request according to the rules specified by each tool and transmits the request to a Web server 101 having a Web application. An HTTP response is returned by the Web server as a result of the processing within the Web application, and the HTTP response is analyzed within the test program to determine the acceptability.

The method that automatically creates test specifications by using the test program has a merit that the same test can be automatically performed any number of times once the test program is described. Alternatively, another method is possible in a regression test that performs a test that has been performed before in which the test to be performed again can be automated by recording an HTTP response received when the first test is performed in a log form, for example, and checking against the recorded log when the test is performed again.

In particular, the test data (2) among the test data (1) to (5) can be reflected to test specifications by actually operating a Web application to be tested and recording at the same time by using an existing operation log acquisition tool.

Such an operation log acquisition tool may be used to reflect the initial/end states (test data (4) and (5)) of a database to test specifications by recording snap shots of the database at some point in time.

However, the method that creates test specifications manually as described above requires the definition of an expected value corresponding to an input based on design information by a creator of the test specifications, which causes a problem of an increase in load on the creator. Particularly, in order to keep the quality of the test specifications, the description must cover all of the test data (1) to (5), which significantly increases the number of steps and the load on the creator of the test specifications.

The name of an item of design information and the name of an item on a JSP file (such as a tag class name and attribute name) often disagree with each other, which requires time for mapping the item name and the item name on a JSP file. This causes a problem that the load on the creator of the test specifications increases.

The method that automatically creates the test specifications by using a test program has a problem that it is difficult to expected output values in detail units of items such as "name" and "address" even by using an operation log acquisition tool since the expected value output on a screen is compared with the entire HTML data to be output.

Particularly, it is impossible to know at which position of HTML data the item to be output appears, which makes the comparison/determination between an item name and an expected value difficult in HTML data.

Furthermore, there is also a problem that when the design function is changed in a Web application even with the unchanged business logic function, it is judged as NG and thus an improper determination is made. In other words, the determination result should be OK if the business logic function is right even with a different design. For example, in a Web application that provides a telephone number and an e-mail address when a name is input, NG is determined if the order of display of the telephone number and the e-mail address is changed or the tag name of each output item is changed even if there is no bug in the Web application itself.

Another problem is that when there exists an item that varies every time a Web application is executed, such as dates and voucher numbers, the determination result becomes NG, which is improper, even if there is no problem in the Web application. Furthermore, later editing of a created expected value is difficult since it is embedded in HTML data, which causes a problem of increase in the load on a creator of the test specifications.

Preferred embodiments for solving some of these example problems from among others and for achieving (without limitation) example objects from among other objects will be described in detail below.

(Schematic Configuration of Test Specifications Creating System)

First of all, a schematic configuration of a test specifications creating system according to an embodiment will be described.

FIG. 1 is an explanatory diagram showing a schematic configuration of a test specifications creating system according to an embodiment. In a test specifications creating system 100, a Web server 101 and a client 102 are mutually communicatably connected over a network 103 such as the Internet. Notably, the Web server 101 and the client 102 may be configured as one machine.

The Web server 101 is a computer machine in which a Web application to be tested is installed. The Web server 101 can provide the client 102 with a service according to the Web application by executing the Web application.

The client 102 is a computer machine to be used by a test specifications creator and corresponds to test specifications creating apparatus according to this embodiment. The client 102 creates test specifications data 110. For the creation, the client 102 accesses the Web server 101 and thus transmits to the Web server 101 a request that requests a Web screen based on arbitrary screen transition specifications and receives the response from the Web server 101. Then, the client 102 analyzes the response and can display the result on a display.

(Hardware Configuration of Computer Machine)

Next, a hardware configuration of the computer machine shown in FIG. 1 will be described. FIG. 2 is a block diagram showing a hardware configuration of the computer machine shown in FIG. 1. In FIG. 2, the computer machine includes a CPU 201, a ROM 202, a RAM 203, an HDD (hard disk drive)

204, an HD (hard disk) 205, an FDD (flexible disk drive) 206, an FD (flexible disk) 207, which is an example of a removable recording medium, a display 208, an I/F (interface) 209, a keyboard 210, a mouse 211, a scanner 212 and a printer 213. These components are respectively connected via a bus 200.

Here, the CPU 201 controls the entire computer machine. The ROM 202 stores a program such as a boot program. The RAM 203 is used as a work area for the CPU 201. The HDD 204 controls the reading/writing of data from/to the HD 205 under the control of the CPU 201. The HD 205 stores the data written under the control of the HDD 204.

The FDD 206 controls the reading/writing of data from/to the FD 207 under the control of the FDD 206. The FD 207 stores the data written under the control of the FDD 206 or causes the computer machine to read the data stored in the FD 207.

The removable recording medium may be a CD-ROM (CD-R or CD-RW), an MO, a DVD (Digital Versatile Disk), a memory card or the like instead of the FD 207. The display 208 displays data such as a document, an image and functional information, including a cursor, an icon and/or a toolbox, for example. The display 208 may be a CRT, a TFT liquid crystal display, or a plasma display, for example.

The I/F 209 is connected to the network 103 such as the Internet via a communication line and is connected to other machines over the network 103. The I/F 209 takes charge of an internal interface with the network 103 and controls the input/output of data from/to an external machine. A modem or a LAN adapter, for example, may be adopted as the I/F 209.

The keyboard 210 includes keys for inputting letters, numbers and commands and is used to input data. The keyboard 210 may be a touch-panel input pad or a numerical keypad. The mouse 211 is used to move a cursor to select a range to move or change the size of a window. A trackball or joystick, for example, may be used as a pointing device if it has the same functions.

The scanner 212 optically scans an image and captures the image data into the computer machine. Notably, the scanner 212 may have an OCR function. The printer 213 prints image data and/or text data. A laser printer or an ink jet printer, for example, may be adopted as the printer 213.

(Test Specifications Data)

Figure 3:
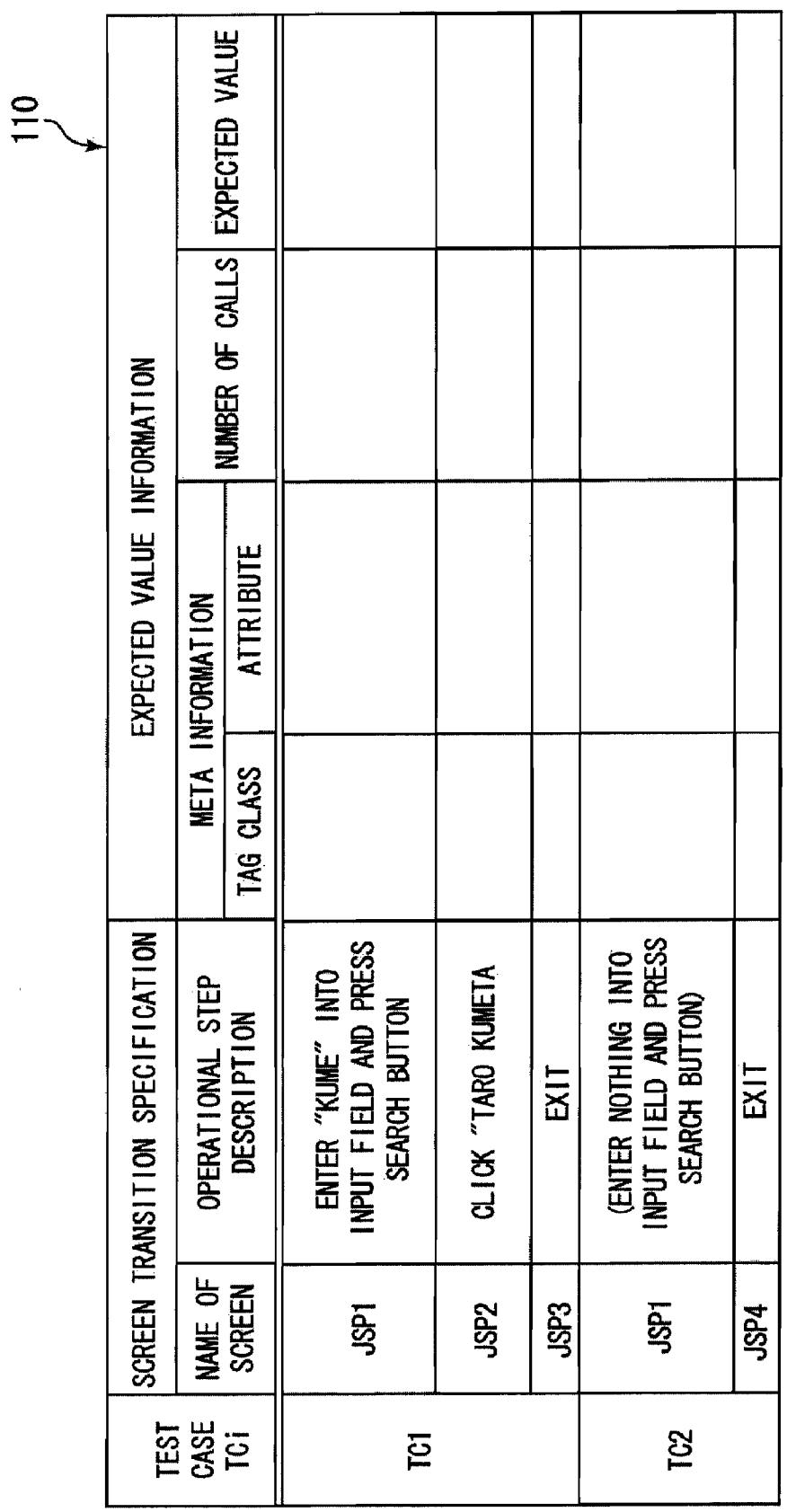
FIG. 3 is an explanatory diagram showing test specifications data before starting the creation.

Next, the test specifications data shown in FIG. 1 will be described. FIG. 3 is an explanatory diagram showing the test specifications data before starting the creation. Test specifications data 110 is electronic data describing a series of screen transition specifications included in a test case of a Web application to be installed in the Web server 101 and may be more specifically created with a macro file, such as for example a spreadsheet in a table form (for example, test case information included in cells forming rows and columns of the table).

In the test specifications data 110 described are a series of screen transition specifications and expected value information for each test case TCi (i=1, 2, ... n) to be used for testing a target Web application. FIG. 3 shows two test cases TC1 and TC2 (n=2). The screen transition specifications may be entered manually, or a part or all of them may be mechanically extracted from design information such as a screen transition diagram.

Figure 4:
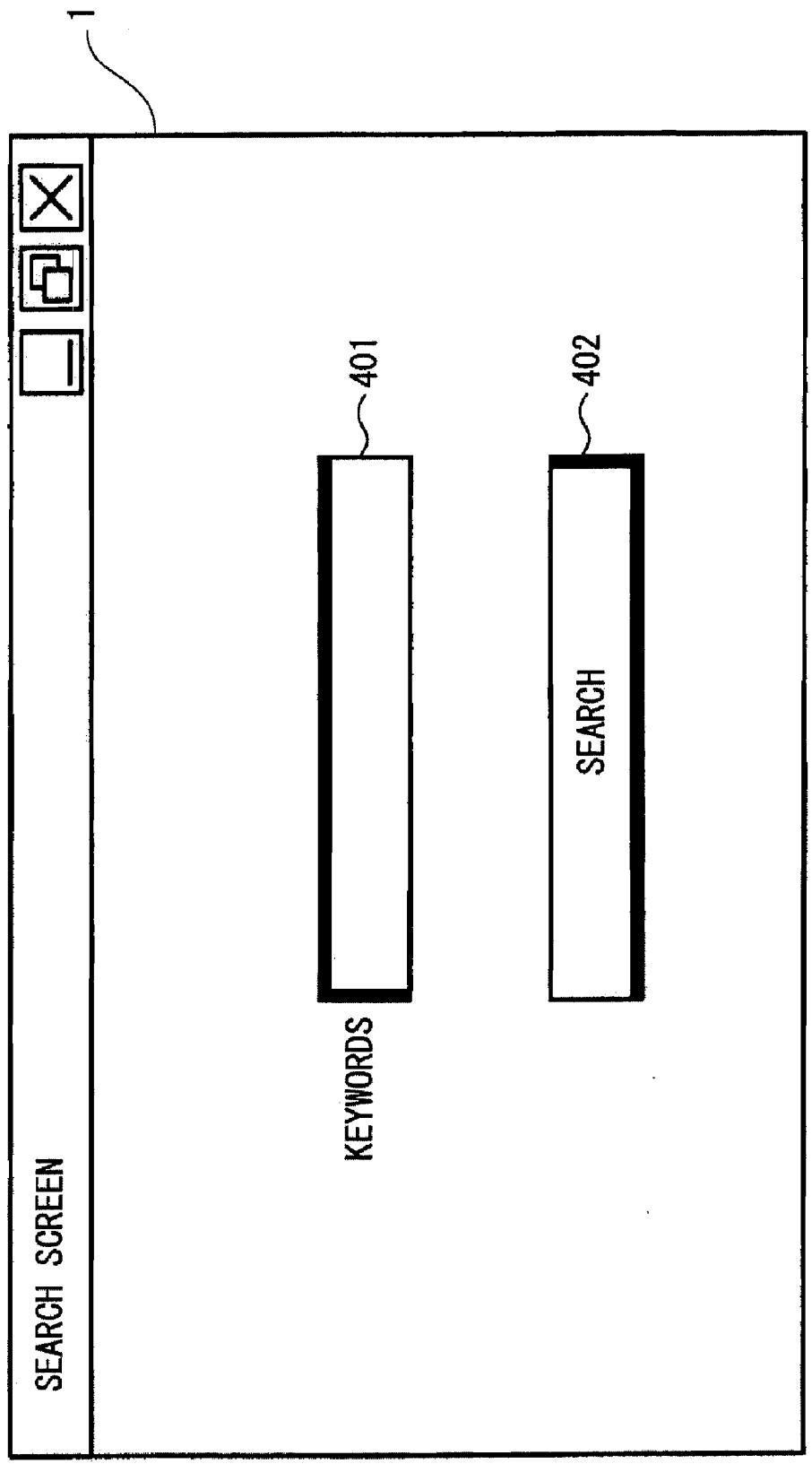
FIG. 4 is an explanatory diagram showing a screen example of a Web screen JSP 1.
Figure 5:
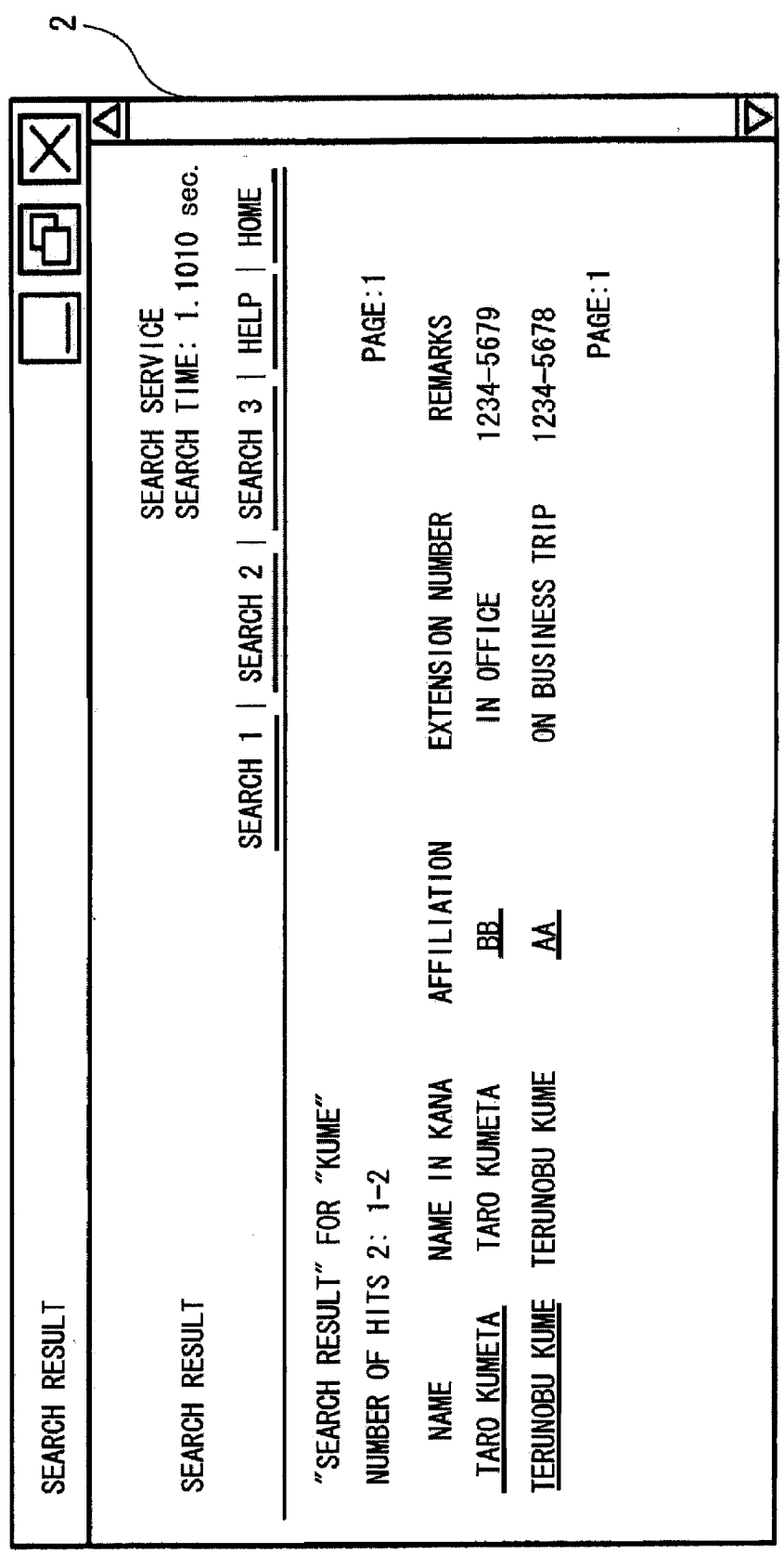
FIG. 5 is an explanatory diagram showing a screen example of a Web screen JSP 2.

The screen transition specifications are identified by a screen name and an operational step description. The screen name is a name by which a screen file on a Web screen to be displayed in a client is identifiable and is described as a JSP file name (such as JSP1 and JSP2) according to the JSP and JAVA language specifications provided by SUN MICROSYSTEMS, INC. in the U.S., for example FIG. 4 is an explanatory diagram showing a screen example of a Web screen JSP1. FIG. 5 is an explanatory diagram showing a screen example of a Web screen JSP2. FIGS. 4 and 5 are screen examples in a case where a Web application is software relating to a telephone number directory search.

In FIG. 3, an operational step description describes operational steps by a user in a case where a corresponding Web screen, that is, a Web screen identified by the screen name of the cell on the left side. After input information is given to the Web screen as in the operational step description, the Web screen of the screen name of the cell at the diagonal bottom left is displayed.

For example, when the Web screen JSP1 shown in FIG. 4 is displayed in a test case TC1, the Kanji for "KUME" is entered into an input field 401 and a search button 402 is clicked. Then, the Web screen JSP2 shown in FIG. 5 is displayed. The destination Web screen JSP2 shows the search result.

Notably, when "end" is described in the operational step description, it means that no subsequent screen transition exists, and the test case TC ends. For example, if the Web screen JSP3 is displayed in the test case TC1, the test for the test case TC1 ends. If the Web screen JSP4 is displayed in the test case TC2, the test for the test case TC2 ends.

On the other hand, during the creation, the expected value information is described based on a response from a Web server in which a Web application is installed. In a test case TCi, when all empty cells for expected value information are filled, the test specifications data 110 relating to the test case TCi completes.

Meta information in the expected value information is information including a tag class and the attribute thereof. The tag class is a class to which a tag of a Web application belongs. The attribute is detail information of the tag class and includes an attribute name (name) and attribute value (property) of a tag belonging to the tag class. The number of calls refers to the number of times of appearance of meta information. The expected value is a value expected to be output when a tag identified by meta information including a tag class, an attribute name and an attribute value is executed.

(Functional Configuration of Each Computer Machine)

Figure 6:
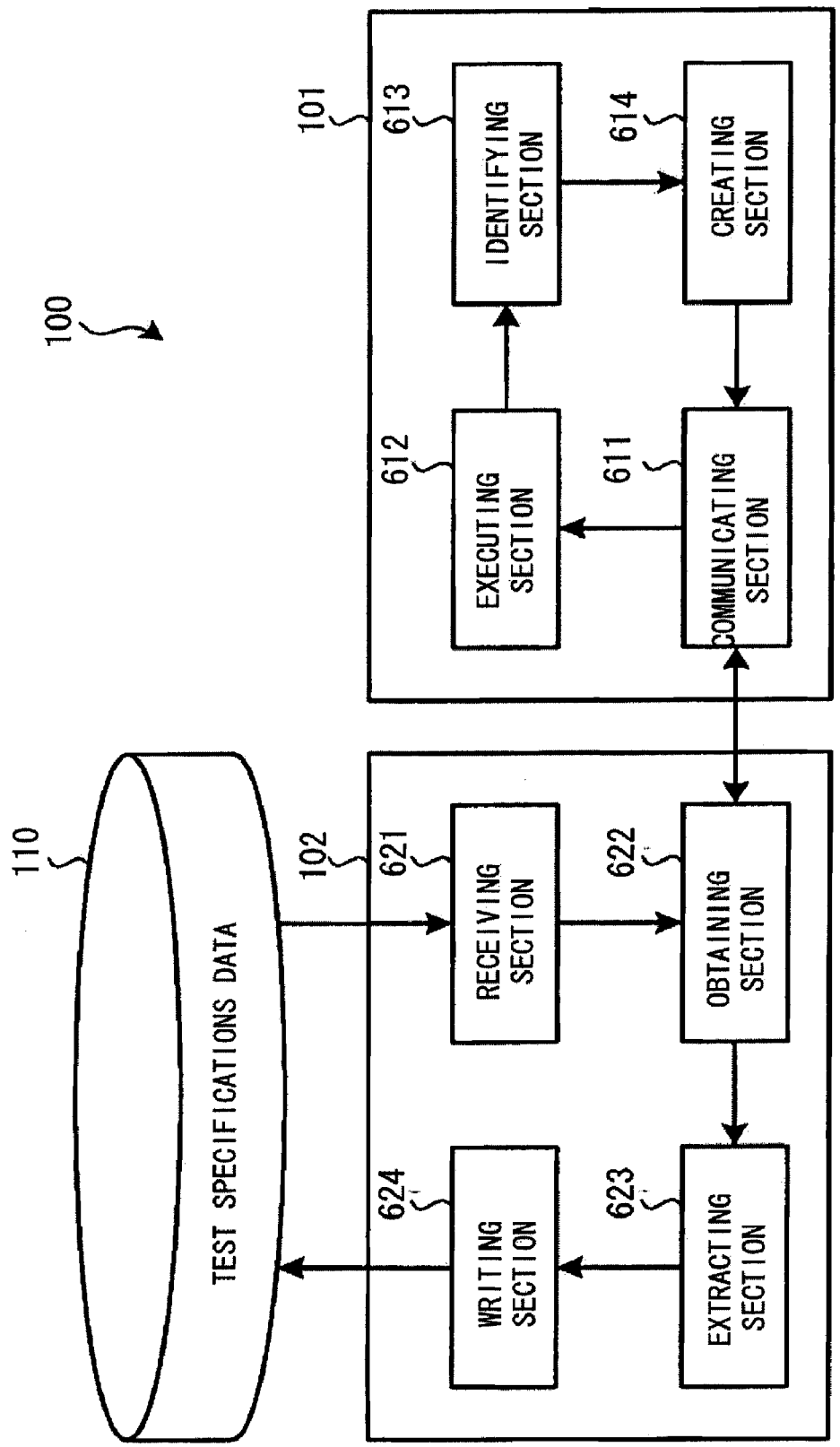
FIG. 6 is a block diagram showing a functional configuration of each of the computer machines shown in FIG. 1.

Next, a functional configuration of each of the computer machines shown in FIG. 1 will be described. FIG. 6 is a block diagram showing a functional configuration of each of the computer machines shown in FIG. 1. First, a functional configuration of the Web server 101 is described.

In FIG. 6, the Web server 101 includes a communication section 611, an executing section 612, an identifying section 613 and a creating section 614. The functional configuration implements its function by causing the CPU 210 to execute a program recorded in a recording medium such as the ROM 202, the RAM 203, and the HD 205 shown in FIG. 2 or through the I/F 209.

The communication section 611 has a function of receiving a request from the client 102. More specifically, the communication section 611 receives a request including an input value such as a URL or a directory for locating a Web application or data input in the input field on a Web screen. Then, the communication section 611 transmits a response created by the creating section 614, which will be described later, to the client 102 that has transmitted the request.

The executing section 612 has a function of executing a Web application in response to the request received by the communication section 611. The result of a calculation by a Web application is called output item. The output item is programmed so that the output position is automatically determined when a Web application is executed. Here, the output position is a display position on a screen determined by interpreting the response to the request.

The identifying section 613 has a function of identifying meta information relating to the execution content of a Web application by the executing section 612. More specifically, the identifying section 613 identifies the description describing a tag class and the tag class attribute relating to a processing when the processing is performed from the information which expresses the execution content of a Web application in source code.

The creating section 614 creates a response to a request received by the communication section 611. Specifically, after meta information is identified by the identifying section 613, the creating section 614 creates a response to a request by embedding the meta information therein in connection with an output item. More specifically, the creating section 614 embeds meta information in connection with the output position of an output item so as to display the meta information along with the output item on a display screen.

For example, in creating a response in HTML format, meta information may be described as an HTML comment to an output item so as to display the meta information along with the output item. The response including meta information is called "response with meta information". The response with meta information is transmitted to the client 102 through the communication section 611.

In this way, the Web server 101 can return the response with meta information containing an output item and meta information on which the expected value information in the test specifications data 110 is based to the client 102 that has transmitted the request.

Next, a functional configuration of the client 102 will be described. The client 102 includes a receiving section 621, an obtaining section 622, an extracting section 623 and a writing section 624. The functional configuration implements its function by causing the CPU 201 to execute a program recorded on a recording medium such as the ROM 202, the RAM 203 and the HD 205 shown in FIG. 2 or through the I/F 209.

First of all, the receiving section 621 receives unfinished test specifications data 110 describing a series of screen transition specifications included in a test case for a Web application to be installed in the Web server. More specifically, the receiving section 621 loads the test specifications data 110 shown in FIG. 3, for example.

The obtaining section 622 transmits a request that requests a Web screen based on arbitrary screen transition specifications to the Web server 101. More specifically, the request is a request that requests a Web screen based on the screen transition specifications selected from a series of screen transition specifications of the test specifications data 110 shown in FIG. 3. Then, by transmitting the request to the Web server 101, the obtaining section 622 receives a response with meta information including an output item, which can be obtained as a result of the execution of the Web application.

The extracting section 623 extracts an expected value for the screen transition specifications from the response with meta information based on the output item included in the response with meta information obtained by the obtaining section 622. More specifically, the extracting section 623 extracts the output item included in the response with meta information as an expected value.

The extracting section 623 also extracts the number of calls for meta information and/or an expected value from the response with meta information, in addition to the expected value. The information including any combinations of the expected value, meta information and/or number of calls, which are extracted by the extracting section 623, is called "expected value information".

The writing section 624 writes the expected value information extracted by the extracting section 623 to the test specifications data 110 received by the receiving section 621 in connection with the screen transition specifications. More specifically, referring to the test case TC1 of the test specifications data 110 shown in FIG. 3 as an example, when a request for obtaining the Web screen JSP1 (such as the URL of the Web screen JSP1) is transmitted under the state that a browser is in operation in the client, the response with meta information according to the request is received.

Through the analysis of the response with meta information, the Web screen JSP1 shown in FIG. 4 is displayed, and the expected value information extracted from the response with meta information is written into an empty cell for expected value information on the right side of the Web screen JSP1.

After that, by transmitting a request with input information given on the displayed Web screen JSP1 to the Web server 101 as in the operational step description, the response with meta information according to the request is received.

Through the analysis of the response with meta information, the Web screen JSP2 is displayed, and expected value information extracted from the response with meta information is written to an empty cell for expected value information on the right side of the Web screen JSP2. By performing the same processing for the Web screen JSP3, all of the expected value information for the test case TC1 is described. Therefore, the test specifications data 110 can be automatically created by the client 102.

The receiving section 621 receives the description of screen transition specifications for a new test case TC during or after the creation of the test specifications data 110. More specifically, the test specifications data 110 during or after the creation is displayed, and, at the same time, a new test case TC is created by referring to the screen transition specifications, which have been written already, and copying the screen transition specifications by a test specifications creator.

Thus, the test specifications creator can easily create the screen transition specifications for a test case similar to the test case for which expected value information has been written already. In this case, the expected value information has not been written yet for the new test case TC, expected value information can be written in the same method as described above. Thus, the completeness of similar test patterns can be increased.

(Detail Internal Configuration of Each of Computer Machines)

Figure 7:
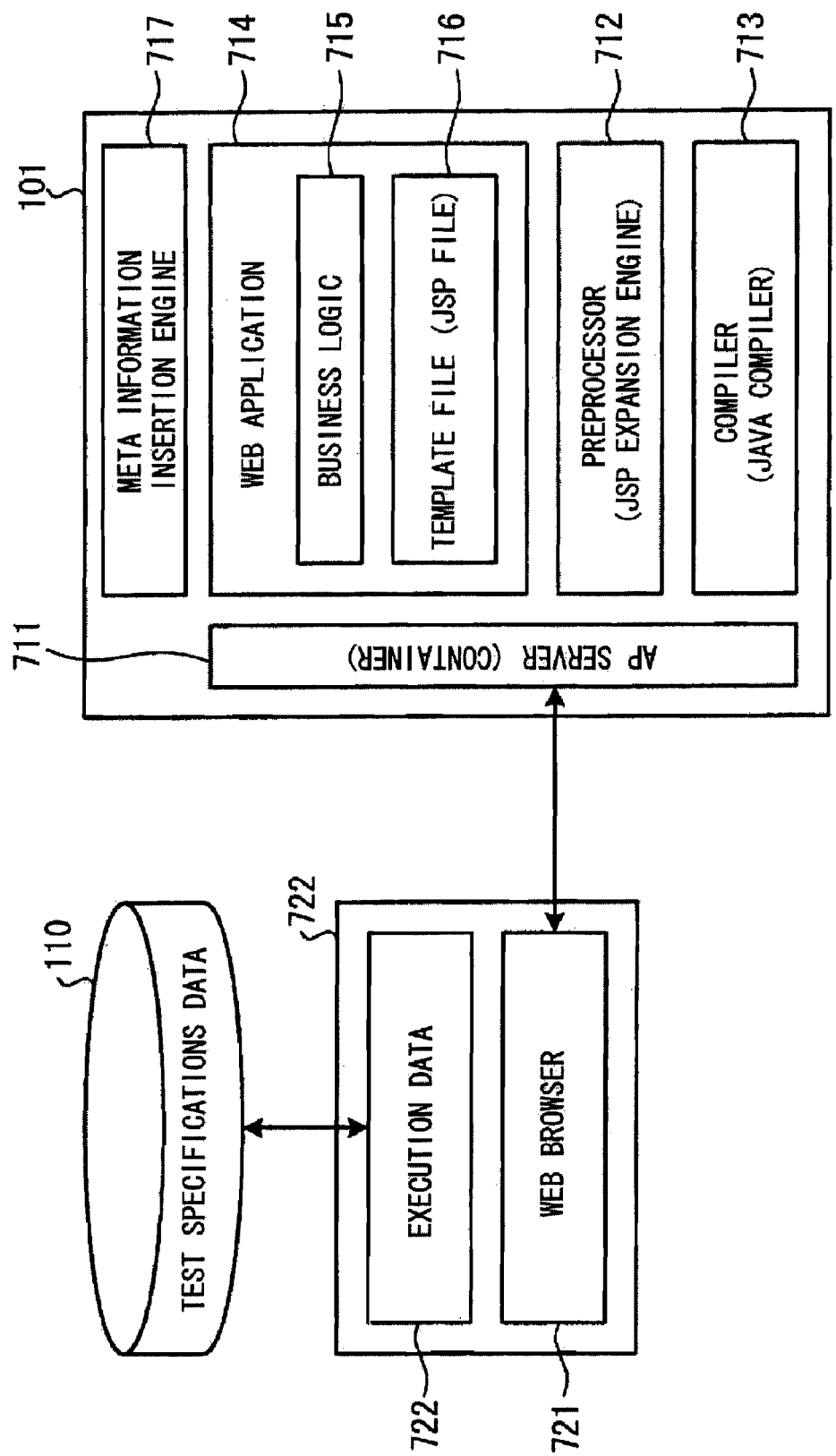
FIG. 7 is a block diagram showing a detail internal configuration of each of the computer machines.

Next, a detail internal configuration of each of the computer machines will be described. FIG. 7 is a block diagram showing a detail internal configuration of each of the computer machines. First of all, a detail internal configuration of the Web server 101 will be described.

The Web server 101 has an AP server 711, a preprocessor 712, a compiler 713, a Web application 714 and a meta information insertion engine 717. The AP server 711 is a program that functions as an environment for executing the Web application 714 and includes the preprocessor 712 and the compiler 713. The AP server 711 corresponds to the communication section 611 and creating section 614 shown in FIG. 6.

Here, according to the JSP and JAVA language specifications provided by SUN MICROSYSTEMS, INC. in the U.S., a JSP expansion engine is applicable as the preprocessor 712, and a JAVA compiler is applicable as the compiler 713.

The Web application 714 to be tested is implemented in the AP server 711, and the Web application 714 includes a business logic 715 and a template file 716. The business logic 715 is a logical description of the Web application 714 for performing operational processing for a business transaction. For example, the business logic 715 is a logical description that defines each business flow such as "Check the inventory when a customer puts an article into a shopping cart" and "Connect to the card company for authentication when the transmission button is pressed".

The template file 716 is a file defining a screen design and the display position of an output item. When JAVA is used, a JSP file is applicable as the template file 716.

In this way, it has become a general practice in recent Web application development to separate the design function from the business logic function. Therefore, the output item processed within the business logic 715 is configured to be displayed at the position specified by a custom tag within a JSP file.

The meta information insertion engine 717 identifies meta information including a tag class, an attribute value of a name attribute and an attribute value of a property attribute from a JAVA source code piece. Then, the meta information insertion engine 717 inserts the meta information as a comment sentence for the output item. The meta information insertion engine 717, Web application 714, business logic 715, and template file 716 (JSP file) are components corresponding to the executing section 612 and identifying section 613 shown in FIG. 6.

Next, a detail internal configuration of the client 102 will be described. The client 102 has a Web browser 721 and an execution navigator 722.

The Web browser 721 is a program having a communication function, an analysis function and a rendering function. The communication function is used to create and transmit an HTTP request to the Web application 714 in the Web server 101 and receive a response with meta information in HTML format (which will be called response HTML with meta information) from the Web server 101. The analysis function is used to analyze the response HTML with meta information received by the communication function. The rendering function renders an analysis result by the analysis function on a display. The Web browser 721 is a component corresponding to the obtaining section 622 shown in FIG. 6.

The execution navigator 722 is a program installed therein for obtaining an operational step description to be executed next, giving it to the Web browser 721 or extracting expected value information from the response HTML with meta information and writing it to the test specifications data 110. The execution navigator 722 is a component corresponding to the receiving section 621, obtaining section 622, extracting section 623 and writing section 624 shown in FIG. 6.

(Operations for Executing Web Application by Web Server 101)

Figure 8:
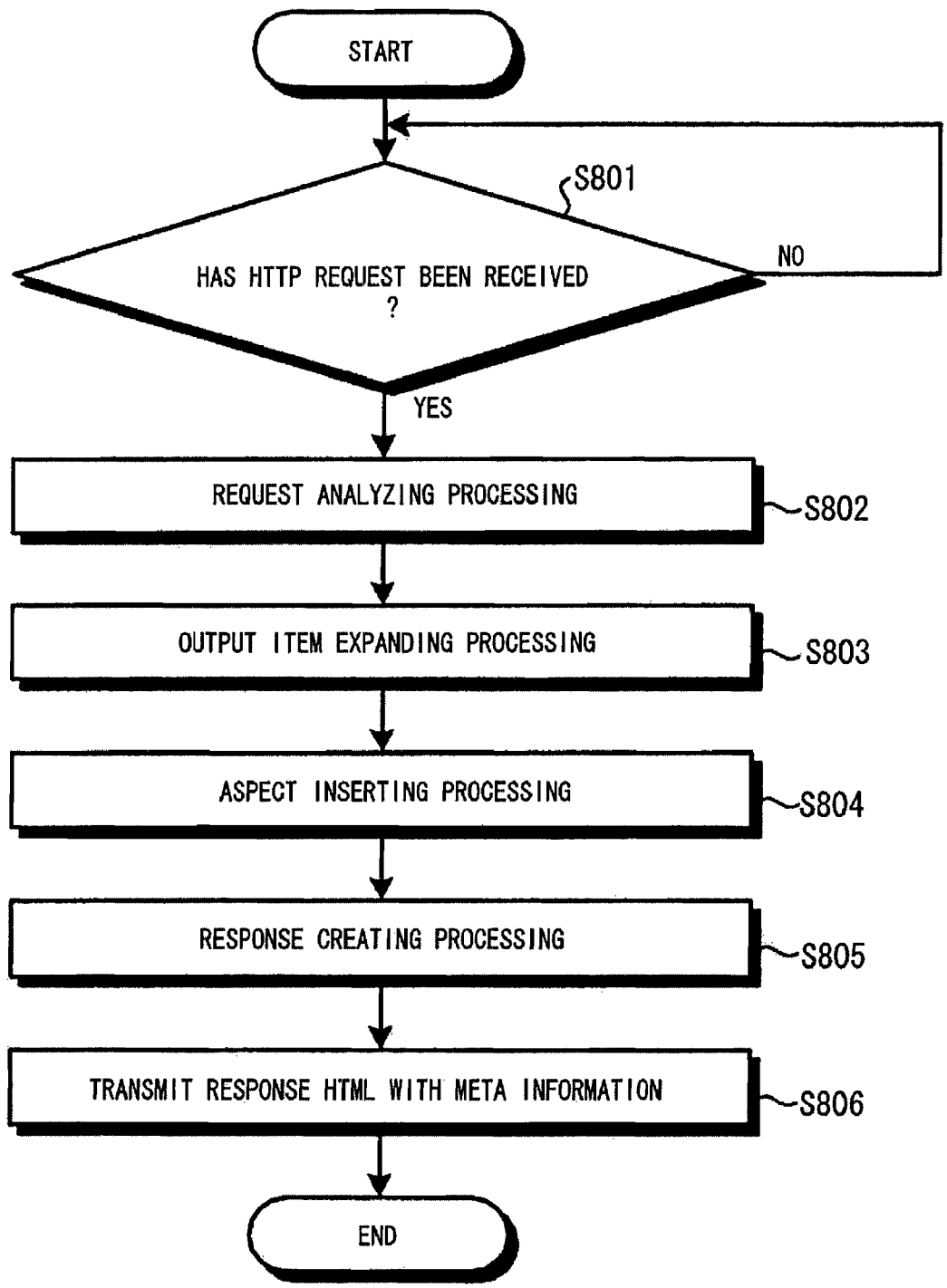
FIG. 8 is a flowchart of executing a Web application by a Web server.

Next, operations for executing a Web application by the Web server 101 will be described. FIG. 8 is a flowchart of executing a Web application by the Web server 101.

Referring to FIG. 8, the Web server 101 first awaits until an Http request is received from the client 102 (S801/No). After receiving the HTTP request (S801/Yes) the Web server 101 performs request analyzing processing (S802), output item expanding processing (S803), aspect inserting processing (S804) and response creating processing (S805). The Web server 101 transmits a response HTML with meta information to the client 102 (S806) and exits the series of operations.

Figures 1, 9:
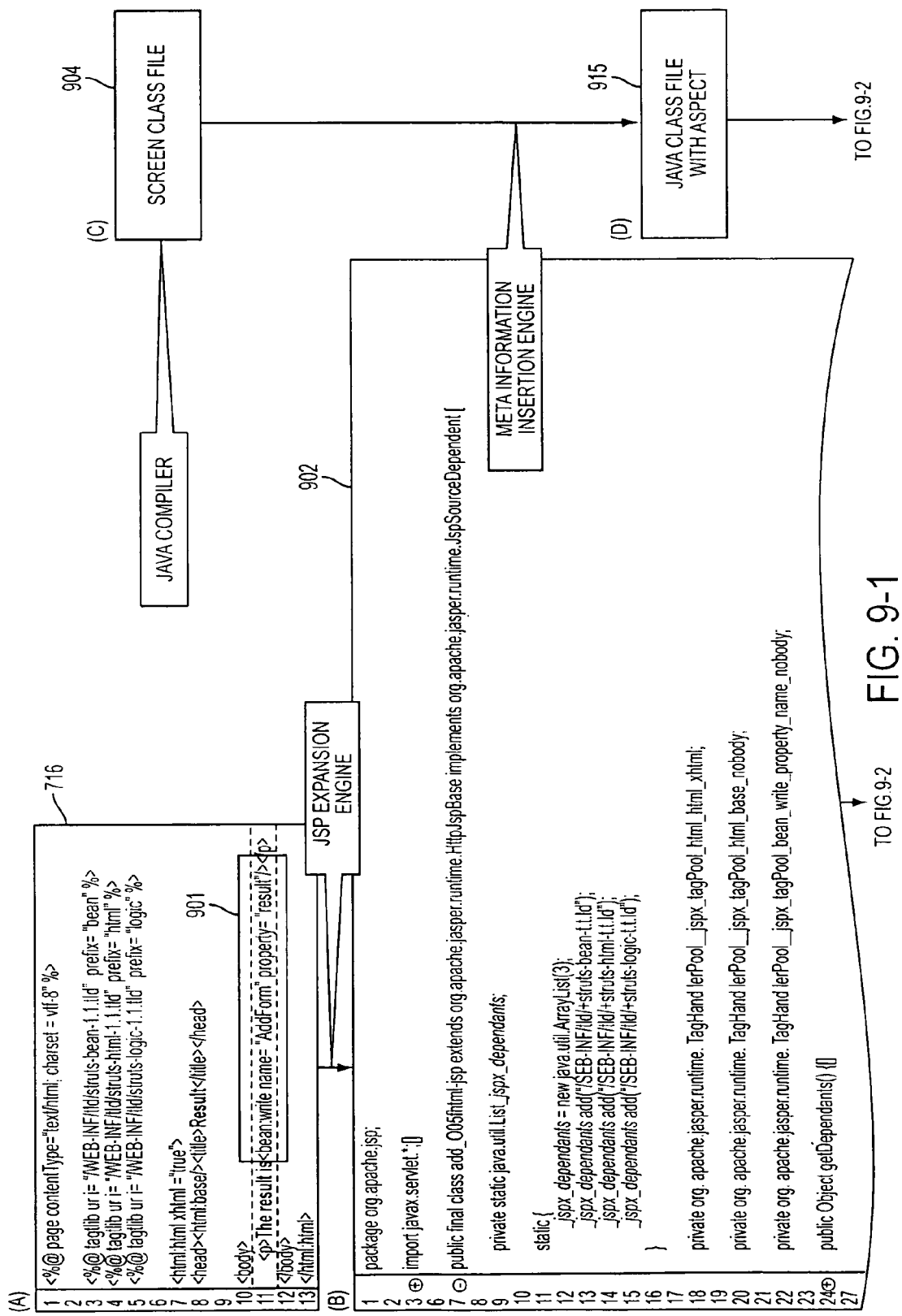
Figures 2, 9:
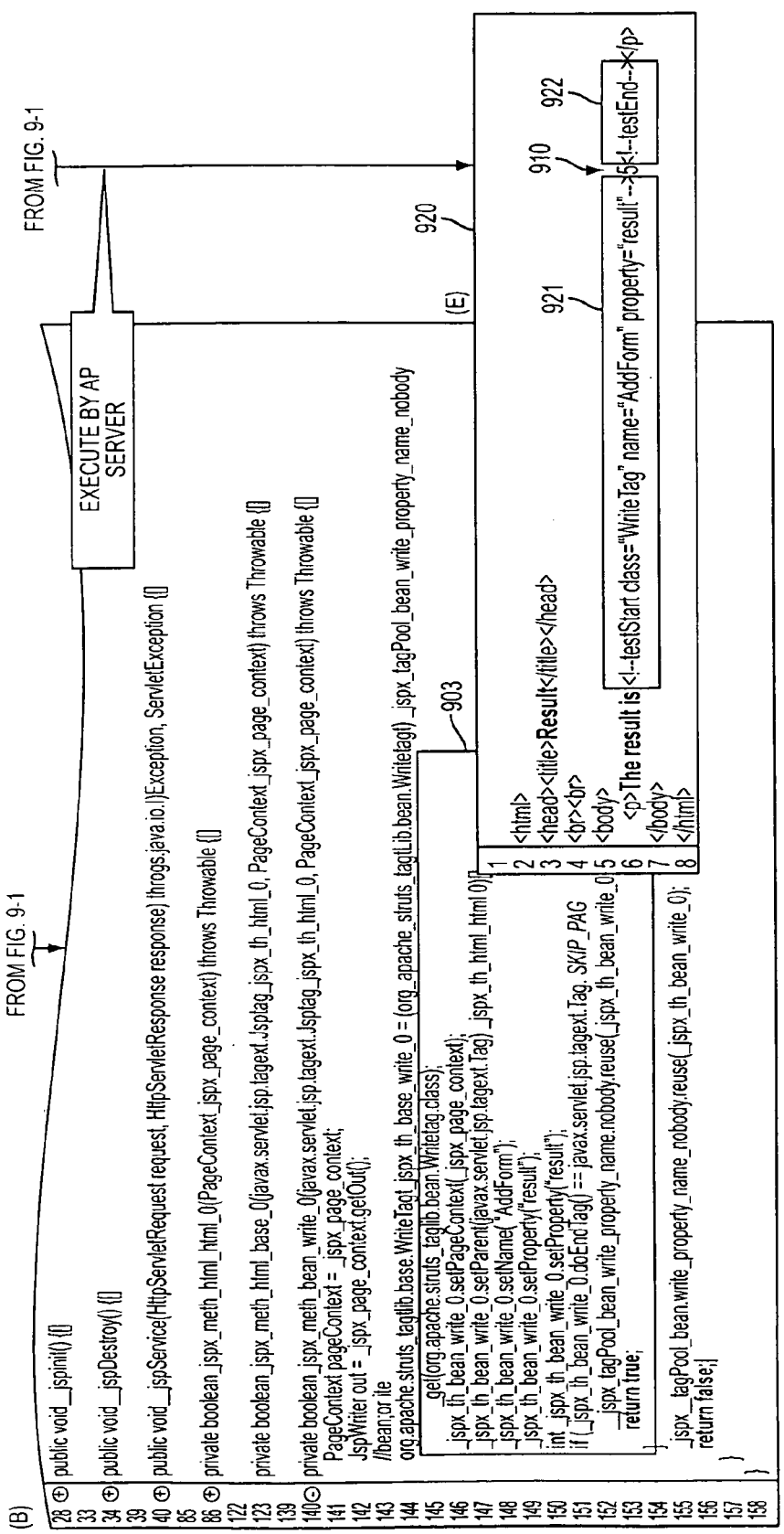

FIG. 9 is a diagram of process transitions in the Web application execution processing by the Web server 101. In the request analyzing processing (S802), first of all, the AP server 711 analyzes the details (such as the request line, the message header and the entity body) of the received HTTP request and invokes the business logic 715 to be tested. The business logic 715 analyzes the details of the HTTP request and calculates the output item to the screen as shown in FIG. 9 process (A).

Next, the Web server 101 performs the output item expanding processing (803). More specifically, the JSP expansion engine determines the display position of an output item 910 within the JSP file 716 as shown in FIG. 9 process (A). Then, as shown in FIG. 9 process (B), the JSP expansion engine converts the JSP file 716 to a source code 902 specifying the output position of the output item 910. By the conversion to the source code 902, a custom tag 901 in the JSP file 716 is converted to a JAVA source piece 903.

The JAVA source piece 903 is a code that invokes a doStartTag( ) method and a doEndTag( ) method of the class corresponding to the custom tag 901. Then, the compiler 713 compiles the converted source code 902 to a binary file to create a screen class file 904 as shown in FIG. 9 process (C).

Next, the Web server 101 performs the aspect inserting processing (S804). More specifically, the meta information insertion engine 717 inserts meta information to the screen class file 904 to obtain a JAVA class file 915 with an aspect as shown in FIG. 9 process (D).

Next, the Web server 101 performs the response creating processing (S805). More specifically, the AP server 711 executes the JAVA class file 915 with an aspect to create a response HTML with meta information 920. As shown in FIG. 9 process (E), HTML comments 921 and 922 are added to the response HTML with meta information 920. After that, the Web server 101 transmits the created response HTML with meta information 920 to the client 102.

Figure 10:
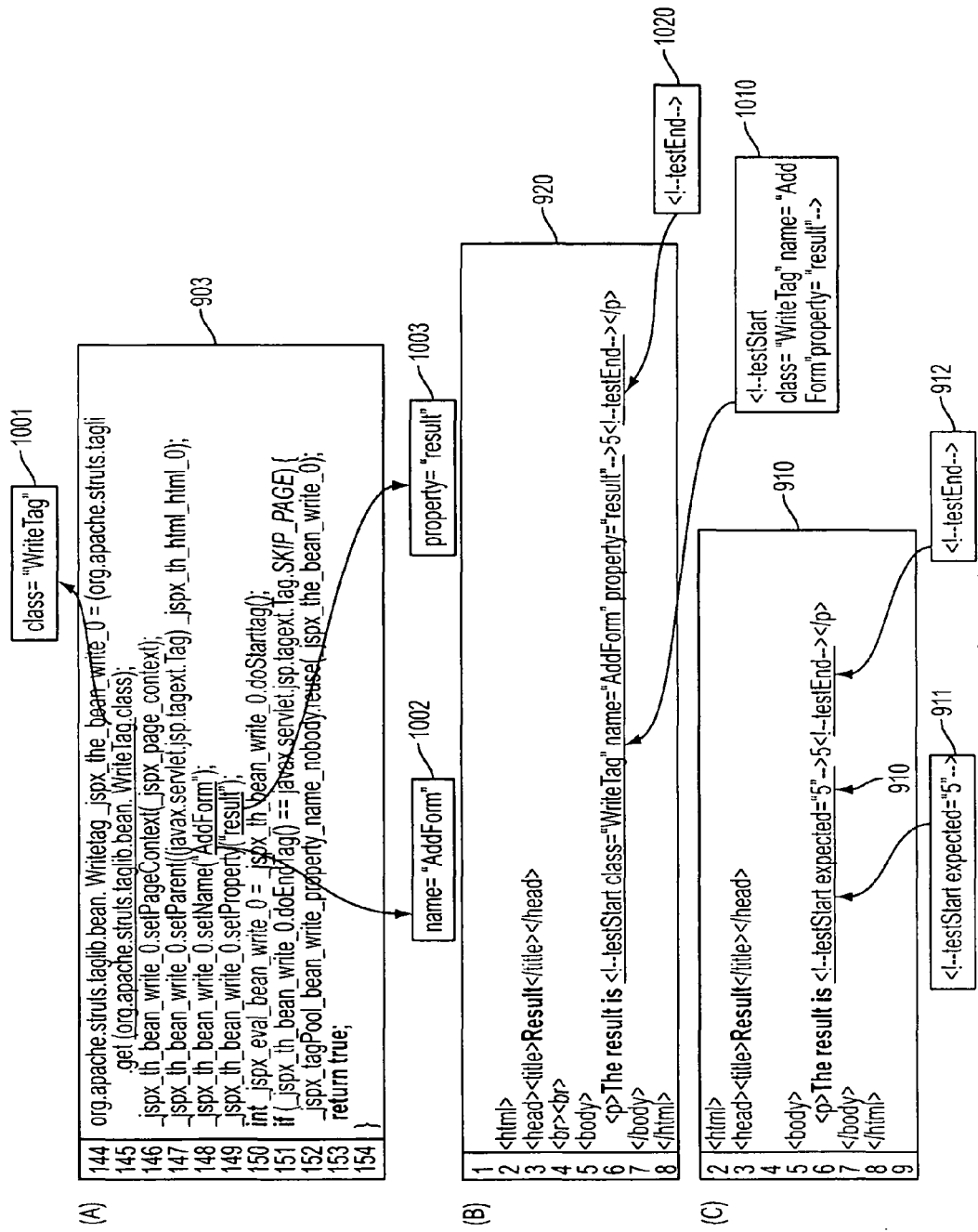
FIG. 10 is a diagram of processing transitions in the Web application execution processing for a response by the Web server.

FIG. 10 is a diagram of processing transitions in how the response HTML with meta information 920 is created by replacing the operation by the JAVA class file with an aspect 915. In a case where an aspect-oriented programming language such as AspectJ is included, the meta information insertion engine 717 and AP server 711 create the response HTML with meta information 920 by operations (1) to (5) below:

(1) The class name of a class to which setPageContext( ) method of the JAVA source piece 903 belongs is obtained. In this example, "org.apache.struts.taglib.bean.WriteTag" on the 145th line of the JAVA source piece 903 shown in FIG. 9 process (B) and FIG. 10 process (A) is obtained as a tag class 1001 of the custom tag 901.

(2) The tag class 1001 and the SetXxx( ) method on the JAVA source piece 903 are extracted as an attribute list. In this case, "AddForm" on the 148th line and "result" on the 149th line of the JAVA source piece 903 shown in FIG. 9 process (B) and FIG. 10 process (A) are extracted as an attribute value 1002 of the name attribute and an attribute value 1003 of the property attribute, respectively.

(3) An HTML comment 1010 resulting from the conversion of meta information to a comment in HTML is output immediately before the doStartTag( ) method is invoked. Thus, as shown in FIG. 10 process (B), "<!--testStart class="WriteTag" name="Addform" property="result"-->" is displayed.

(4) The doStartTag( ) method and doEndTag( ) method are executed, and the Web application 714 is executed normally. Thus, as shown in FIG. 10 process (C), the output value "5" is displayed as the output item 910 of the execution result.

(5) Immediately after the end of the doEndTag( ), an HTML comment 1020 is output. Thus, as shown in FIG. 10 process (B), "<!--testEnd-->" is displayed.

FIG. 11 is an explanatory diagram showing a result of the execution of the Web application 714 by (1) to (5) above. In the response HTML with meta information 920 as shown in FIG. 11, the HTML comments 921 and 922 describing meta information are placed before and after the output position of the output value "5", which is the output item 910, for output (i.e., the meta information is embedded in tags across the expected value or the expected value is flanked with meta information). Although the embodiments are not limited to such a format for denoting the relationship between meta information and expected value, and other formats can be provided. Thus, in S806, the response HTML with meta information 920 is returned to the client 102.

(Operations for Creating Test Specifications by Client 102)

Figure 12:
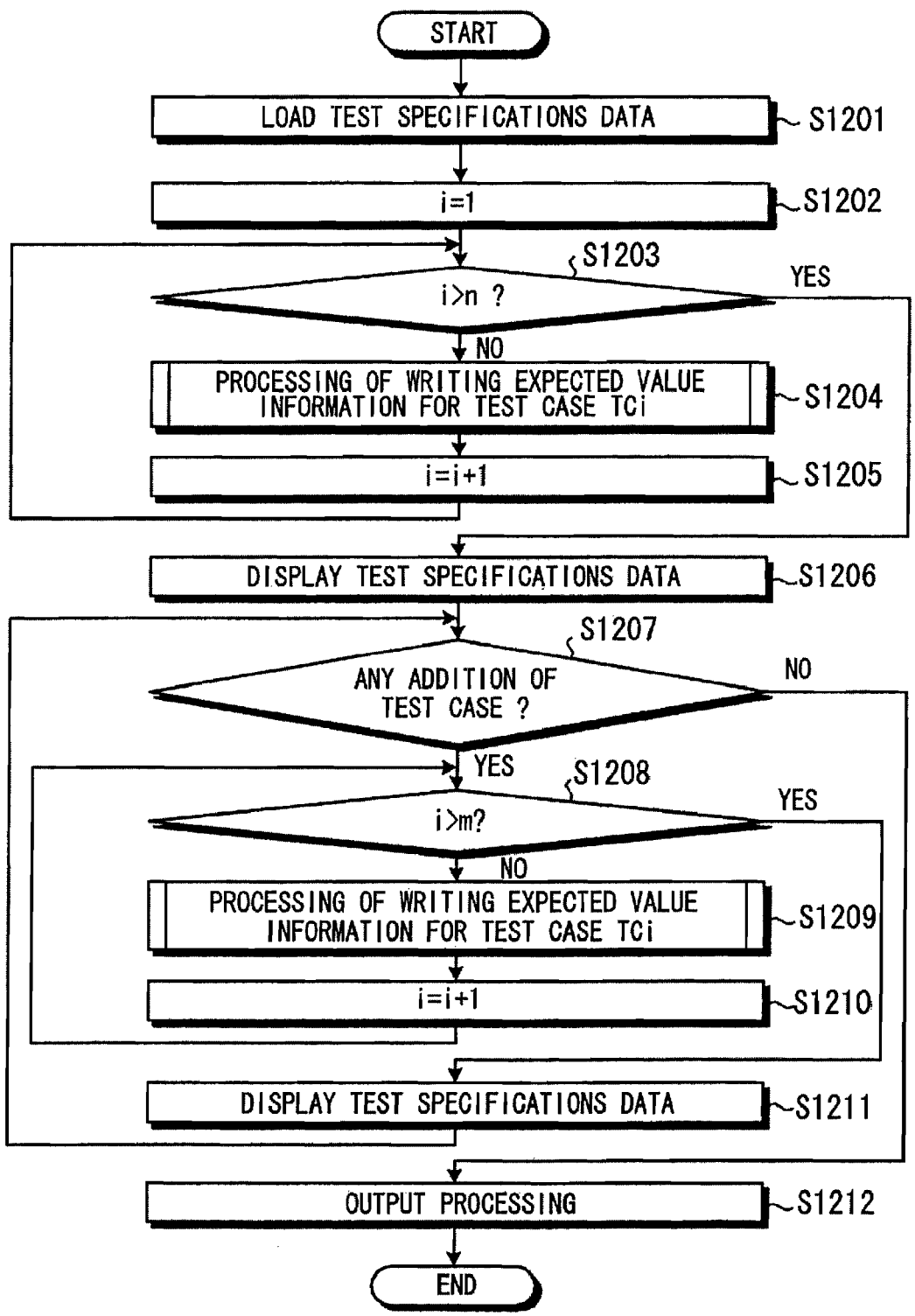
FIG. 12 is a flowchart showing a routine of test specifications creating processing by a client.

FIG. 12 is a flowchart showing a routine of test specifications creating processing by the client 102.

In FIG. 12, the client 102 first loads the test specifications data 110 shown in FIG. 3 (S1201). Then, the client 102 defines the index i for a test case Tc as i=1 (S1202) and determines whether i>n or not (S1203). If not i>n (S1203/No), the client 102 performs processing of writing expected value information for the test case TCi (S1204). After that, the client 102 increments the i (S1205) and returns to S1203.

After that, f i>n (S1203/Yes), the client 102 displays the test specifications data 110 on the Web browser 721 (S1206). Thus, the expected value information can be checked visually. Then, the client 102 determines whether any test case has been added or not (S1207). If so (S1207/Yes), the client 102 determines whether i>m or not (S1208) where m is the total number of test cases after the addition.

If not i>m (S1208/No), the client 102 performs processing of writing expected value information for the test case TCi (S1209). After that, the client 102 increments the i (S1210) and returns to S1208.

After that, if i>m (S1208/Yes), the client 102 displays the test specifications data 110 on the Web browser 721 (S1211). Thus, the expected value information for the addition can be checked visually. Then, the client 102 returns to S1207.

If no test case has been added in S1207 (S1207/No), the client 102 performs output processing on the test specifications data 110, such as storage to the RAM 203 and/or HD 205, display on the display 208, print output to the printer 213 and transmission to other computer machine (S1212) and exits the series of the operations.

(Operations for Writing Expected Value Information for Test Case TCi)

Figure 13:
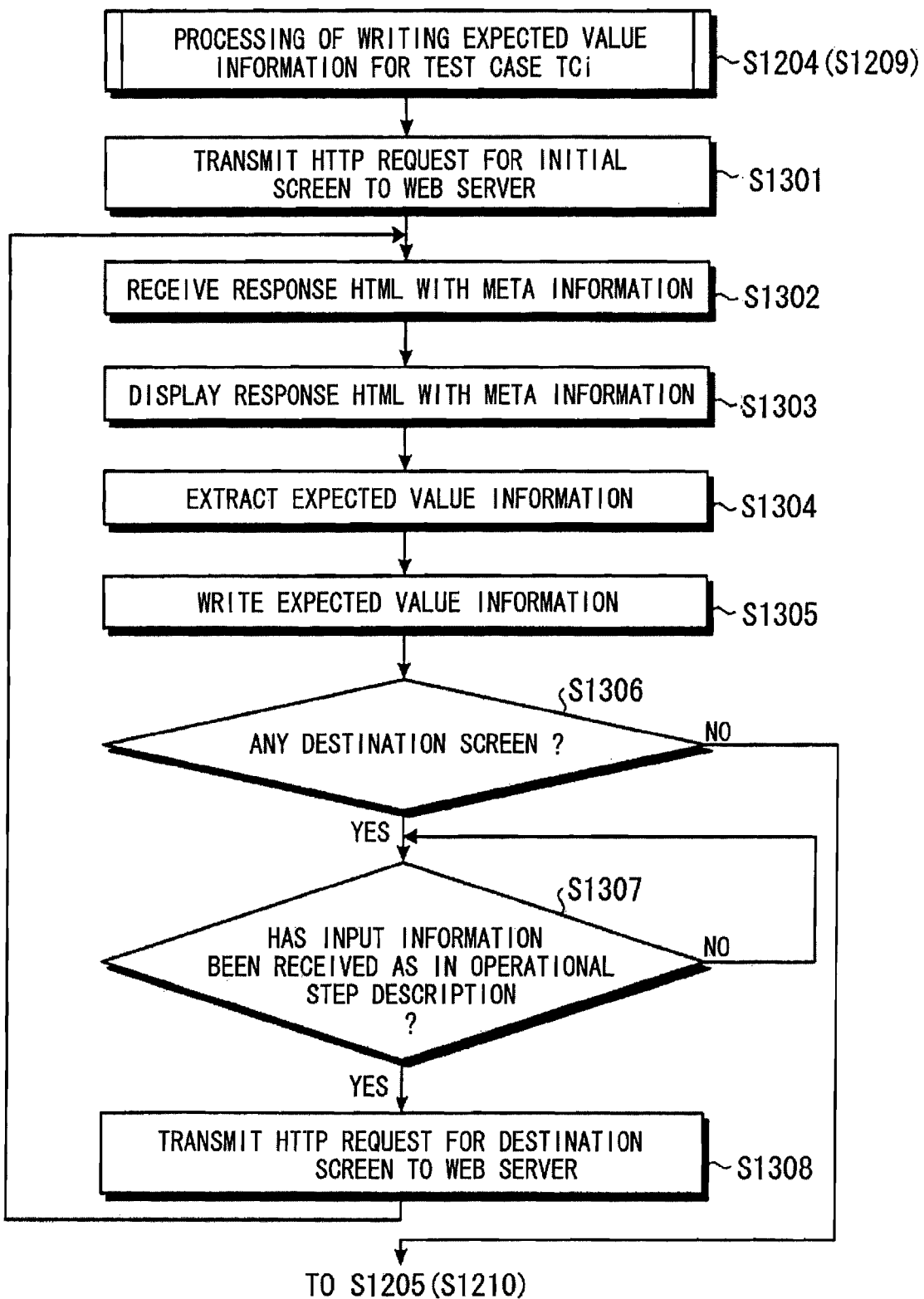
FIG. 13 is a flowchart of expected value information writing processing for a test case TCi.

FIG. 13 is a flowchart of the expected value information writing processing for the test case TCi shown in S1204 and S1209.

In FIG. 13, the client 102 first transmits an HTTP request for the initial screen to the Web server 101 (S1301). Describing the test case TC1 of the test specifications data 110 shown in FIG. 3, for example, since the Web screen JSP1 is the initial screen, the client 102 transmits the HTTP request for the Web screen JSP1 to the Web server 101.

After transmitting the HTTP request to the Web server 101, the client 102 receives the response HTML with meta information 920 according to the HTTP request (S1302). Then, the client 102 displays the response HTML with meta information 920 on the Web browser 721 (S1303).

After that, the client 102 analyzes the response HTML with meta information 920 with the Web browser 721 and extracts the expected value information from the response HTML with meta information 920 (S1304). Then, the client 102 writes the extracted expected value information into an empty cell for the test case TCi (S1305). After that, the client 102 determines whether any destination screen to which the current Web screen is changed exists or not in the test case TCi (S1306).

If so (S1306/Yes), the client 102 awaits the reception of input information as in the operational step description on the current Web screen (step S1307/No). Describing the test case TC1 of the test specifications data 110 shown in FIG. 3, for example, the client 102 awaits the reception of the input information input as in the operational step description "ENTER 'KUME' (in Kanji) INTO INPUT FIELD AND PRESS SEARCH BUTTON" on the Web screen JSP1.

If the input information is received (S1307/Yes), the client 102 transmits an HTTP request for the destination screen, that is, an HTTP request including the input information to the Web server 101 (S1308) and returns to S1302. On the other hand, if no destination screen exists in S1306 (S1306/No), the client 102 moves to S1205 (or S1210). Thus, the operations of writing expected value information for the test case TCi ends.

(Examples of Creation of Test Specifications Data 110)

Next, examples of creation of the test specifications data 110 according to embodiments will be described. Here, an example will be described in which expected value information is to be written into the test specifications data 110 shown in FIG. 3. Therefore, the initial screen is the Web screen JSP1 shown in FIG. 4, and the destination screen from the Web screen JSP1 is the Web screen JSP2 shown in FIG. 5.

The client 102 first transmits an HTTP request for the Web screen JSP1 to the Web server 101 and then receives the response HTML with meta information 920. The response HTML with meta information 920 is displayed as the Web screen JSP1 by the Web browser 721. The client 102 analyzes the response HTML with meta information 920 and thus extracts the expected value information relating to the Web screen JSP1.

More specifically, the execution navigator 722 scans the inside of the response HTML with meta information 920 and detects the value at the part between "<!--testStart XXX-->" and "<!--testEnd-->" where XXX is a string as meta information. Then, the execution navigator 722 determines the string between the tags as the output item resulting from the execution of the Web application 714. Then, the execution navigator 722 extracts the output item as the expected value.

The execution navigator 722 further extracts the tag class and the attribute from the description XXX of the meta information in the "<!--testStart XXX-->". Then, the execution navigator 722 writes the extracted expected value and meta information (including the tag class and the attribute) to the test specifications data 110. The execution navigator 722 further writes the number of calls for the attribute.

Figure 14:
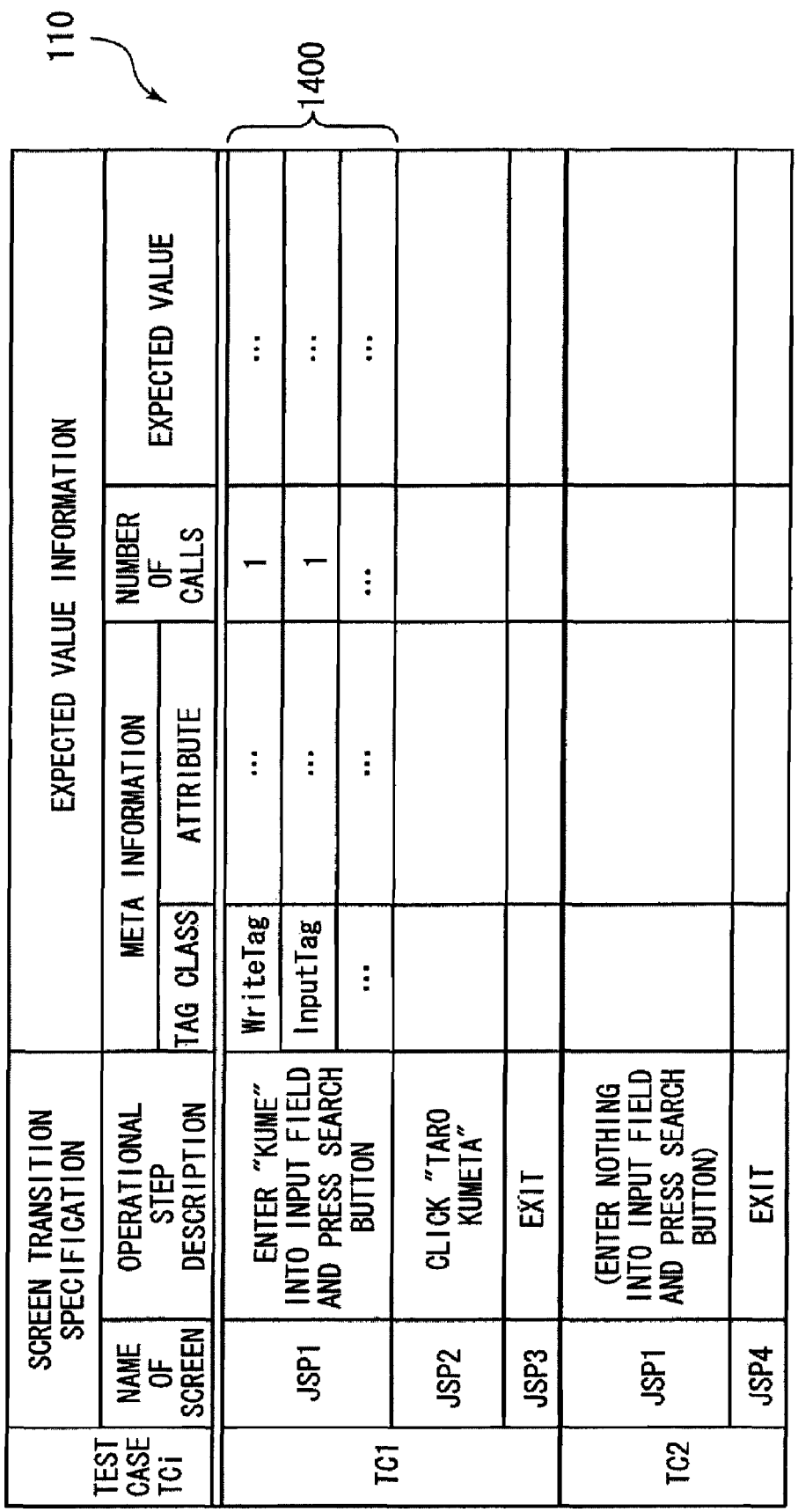
FIG. 14 is an explanatory diagram showing the test specifications data after expected value information is written on a Web screen JSP1.

FIG. 14 is an explanatory diagram showing the test specifications data 110 after expected value information is written on the Web screen JSP1. FIG. 14 shows that expected value information has been written into the cell within an area 1400.

Next, an HTTP request with input information as in the operational step description "ENTER 'KUME' (in Kanji) INTO INPUT FIELD AND PRESS SEARCH BUTTON" on the Web screen JSP1 is transmitted to the Web server 101, and the response HTML with meta information 920 is then received. The response HTML with meta information 920 is displayed as a Web screen JSP2 by the Web browser 721. By analyzing the response HTML with meta information 920, the expected value information relating to the Web screen JSP2 is extracted.

The extraction method by the execution navigator 722 is the same as that on the Web screen JSP1. FIG. 15 is an explanatory diagram showing the test specifications data 110 after expected value information is written on the Web screen JSP2. FIG. 15 shows that expected value information has been written into a cell within an area 1500.

Since the attributes "name", "kana", "affiliation", "external", "presence" and "pageNum" first appear as "TARO KUMETA" (in Kanji), "TARO KUMETA" (in Kana), "BB", "IN OFFICE" and "1234-5679", the number of calls for each is "1". On the other hand, the "TERUNOBU KUME" (in Kanji), "TERUNOBU KUME" (in Kana), "AA", "1234-5678" and "ON BUSINESS TRIP" are loaded again, the calls are accumulated, and the number of calls for each is "2".

Next, similarly, an HTTP request with input information given as in the operational step description "CLICK 'TARO KUMETA' (in Kanji)" on the Web screen JSP 2, that is, given by clicking "TARO KUMETA" (in Kanji) on the Web screen JSP2 shown in FIG. 5 is transmitted to the Web server 101, and the response HTML with meta information 920 is thus received. The response HTML with meta information 920 is displayed as a Web screen JSP3 by the Web browser 721.

FIG. 16 is an explanatory diagram showing an example of the Web screen JSP3. The Web screen JSP3 is a screen displaying personal information. Then, expected value information relating to the Web screen JSP3 is extracted by analyzing the response HTML with meta information 920.

The extraction method by the execution navigator 722 is the same as that on the Web screens JSP1 and JSP2. FIG. 17 is an explanatory diagram showing the test specifications data 110 after expected value information is written on the Web screen JSP3. FIG. 17 shows that the expected value information has been written into a cell within an area 1700. Thus, the writing of expected value information for the test case TC1 completes.

After that, by performing the same processing also on the test case TC2, expected value information is also written for the test case TC2. FIG. 18 is an explanatory diagram showing the test specifications data after the expected value information is written for the test case TC2. FIG. 18 shows that the expected value information has been written into a cell within an area 1800 for the Web screen JSP1. FIG. 18 further shows that the expected value information has been written into a cell within an area 1801 for a Web screen JSP4.

FIG. 19 is an explanatory diagram showing an example of the Web screen JSP4. Thus, the writing of expected value information for the test case TC2 completes. The completion of the writing for the test case TC means the completion of the creation of the test specifications data 110.

After that, in order to add a new test case as needed, a cell with the description of screen transition specifications for the test case TCi for reference is copied.

FIG. 20 is an explanatory diagram showing the test specifications data 110 further including screen transition specifications for a new test case TC3. Referring to FIG. 20, the descriptions for the test case TC1 are copied and are partially changed. That is, the operational step description on the Web screen JSP1 is changed to "ENTER 'KUMETA' (in Kanji) INTO INPUT FIELD AND PRESS SEARCH BUTTON", and the screen name of the Web screen is defined as JSP5.

Figure 21:
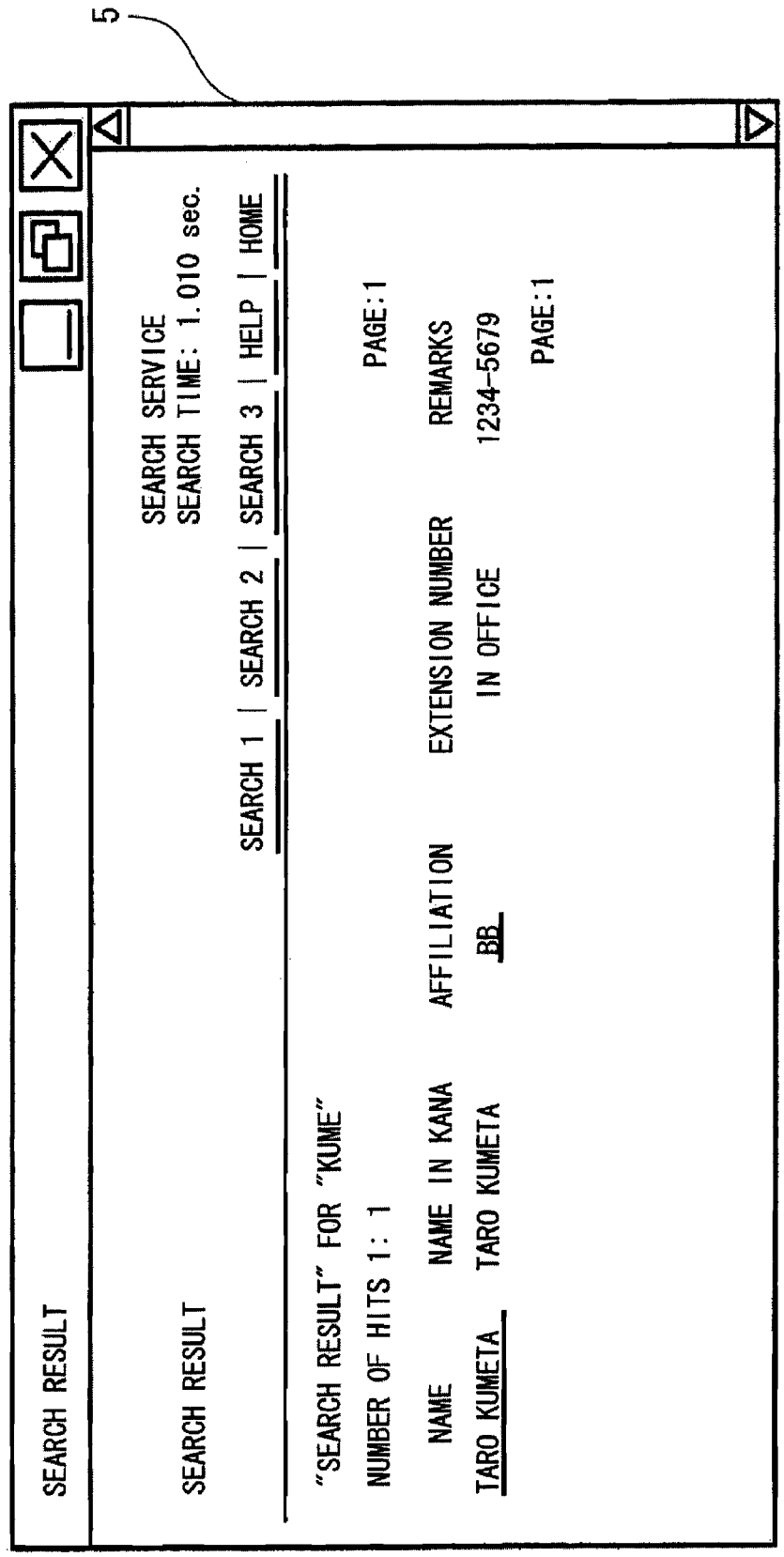
FIG. 21 is an explanatory diagram showing an example of a Web screen JSP 5.

FIG. 21 is an explanatory diagram showing an example of the Web screen JSP 5. After that, by performing the same processing also on the added test case TC3, expected value information for the test case TC3 is also written.

Figure 22B:
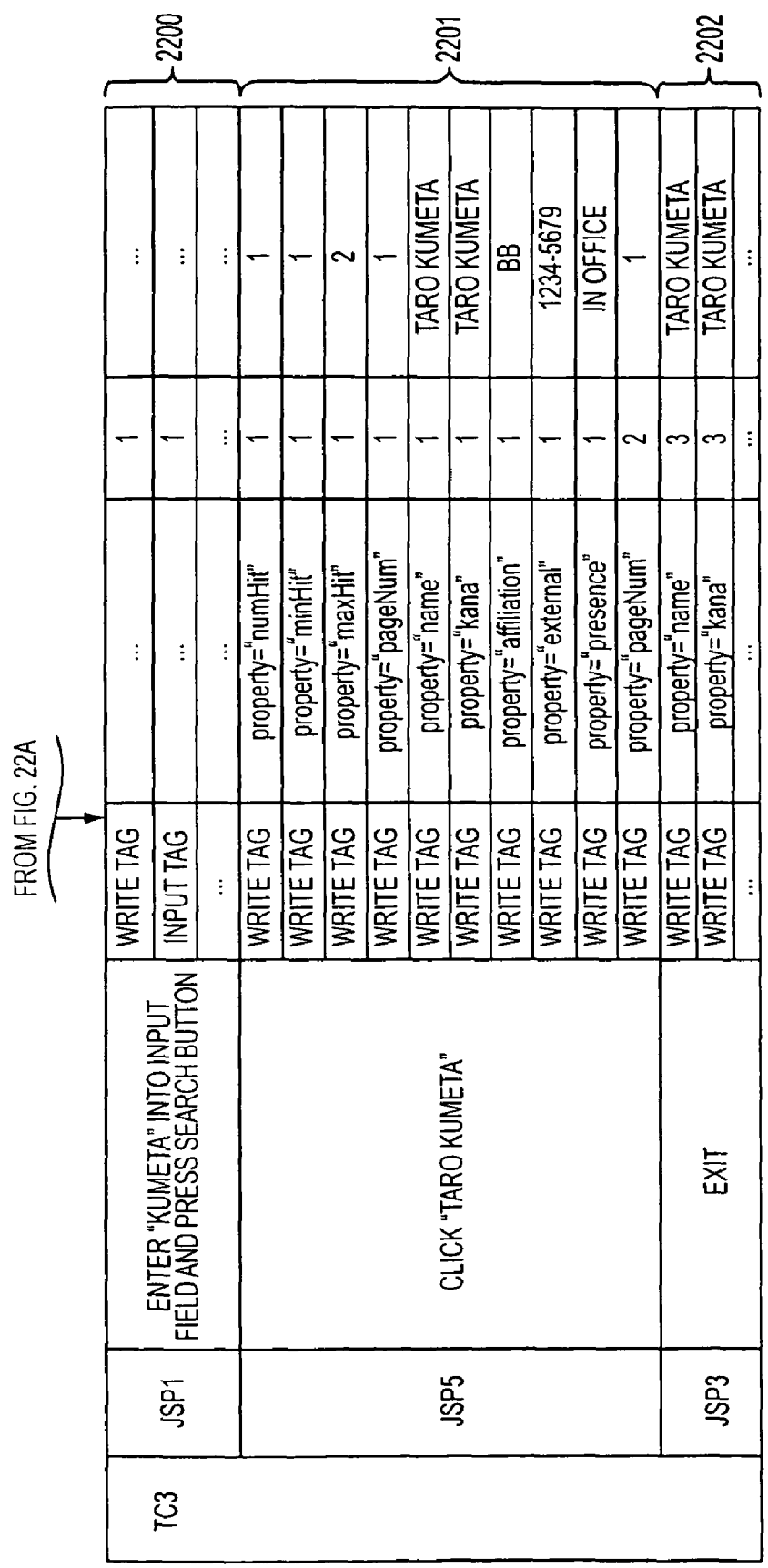

FIG. 22 is an explanatory diagram showing test specifications data after expected value information is written for the test case TC3. FIG. 22 shows that the expected value information has been written into a cell within an area 2200 for the Web screen JSP1. FIG. 22 further shows that the expected value information has been written into a cell within an area 2201 for the Web screen JSP5. FIG. 22 further shows that the expected value information has been written into a cell within an area 2202 for the Web screen JSP3.

According to this embodiment, since the expected value corresponding to each output item can be obtained in this way, while the Web application 714 is being executed, the test specifications in output items can be created easily. In a case where an expected value created once is wrong, it can be edited easily for the correction.

By changing the obtained expected values to an undefined value or a date format, for example, the criterion of determination for the output item that varies every execution can be changed. Thus, the regression does not result in NG improperly even if the HTML to be output includes an undefined value such as a date. Since an item having an error can also be detected when the error is detected in the future test, a test practitioner can significantly reduce the time for tracking down the cause of the error after that.

In the embodiment described above, the screen transition specifications of the test specifications data 110 includes a combination of a screen name and an operational step description, however, a screen name may be only included therein. In a case where a user operation is not necessary, the screen transition specifications may preferably include a screen name only. In this case, the processing in S1307 on the flowchart shown in FIG. 13 is omitted.

Therefore, the time can be saved for giving input information as in an operational step description by a test practitioner (test specifications creator) during the creation of the test specifications data 110, which can reduce the load relating to the creation on the test practitioner (test specifications creator).

Thus, the test specifications data 110 including screen transition specifications and an expected value can be created in a table form while the Web application 714 is being executed. Therefore, since the expected value can be obtained from the result of the execution once, a developer only needs to determine whether the obtained expected value is correct or not. If it is not correct, a developer can correct the expected value during edition. A developer does not have to consider the mapping between design information and an item name since the developer only has to know the item name (screen name) on JSP, which can reduce the load on the developer.

It should be noted that the test specifications creating method according to the embodiments can be implemented by executing a prepared program in a computer such as a personal computer and a work station. The program may be recorded on a computer readable recording medium such as a hard disk, a flexible disk, a CD-ROM, an MO and a DVD and be executed by loading from the recording medium by a computer. The program may be stored in a transmission medium which can be distributed over a network such as the Internet. In other words, the embodiments can be implemented in computing hardware and/or software. Further, any combinations of the described features, functions, and/or operations may be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer readable storage medium that stores a test specifications creating program causing a computer to execute operations comprising:
receiving unfinished test specifications data describing a series of screen transition specifications included in a test case for a Web application to be installed in a Web server;
obtaining a response including an output item, according to a result of execution of the Web application, by giving a request that requests a Web screen based on the screen transition specifications selected from the series of screen transition specifications to the Web application;
extracting an expected value for the screen transition specifications from the response based on the output item included in the obtained response; and
writing the extracted expected value to the received unfinished test specifications data in connection with the screen transition specifications.

2. The non-transitory computer readable storage medium that stores test specifications creating program according to claim 1, wherein:
the obtaining obtains the response including the output item and meta information relating to the output item;
the extracting extracts the expected value for the screen transition specifications and the meta information from the response, based on the output item included in the obtained response; and
the writing writes the extracted expected value and the meta information in connection with the screen transition specifications.

3. The non-transitory computer readable storage medium that stores a test specifications creating program according to claim 2, wherein the meta information is embedded in tags across the expected value.

4. The non-transitory computer readable storage medium that stores a test specifications creating program according to claim 1, wherein:
the obtaining obtains a response relating to a destination Web screen including an output item, according to the execution of the Web application by giving a request that requests the destination Web screen of the Web screen to the Web application by operating according to an operational step description, if the operational step description is included in the screen transition specifications;
the extracting extracts an expected value for screen transition specifications relating to the destination Web screen from the response relating to the destination Web screen based on the output item included in the response relating to the obtained destination Web screen; and
the writing writes the extracted expected value for the screen transition specifications relating to the destination Web screen in connection with the screen transition specifications of the obtained destination Web screen.

5. The non-transitory computer readable storage medium that stores a test specifications creating program according to claim 1, wherein:
the obtaining obtains a response relating to a destination Web screen including the output item obtained as a result of the execution of the Web application by giving a request that requests the destination Web screen of the Web screen to the Web application;
the extracting extracts an expected value for screen transition specifications relating to the destination Web screen from the response relating to the destination Web screen based on the output item included in the response relating to the obtained destination Web screen; and
the writing writes the extracted expected value for the screen transition specifications relating to the destination Web screen in connection with the screen transition specifications of the obtained destination Web screen.

6. The non-transitory computer readable storage medium that stores a test specifications creating program according to claim 1, wherein the receiving receives additional input to the test specifications data for another series of screen transition specifications as additional screen transitional specifications, which is similar to the series of screen transition specifications;
the obtaining obtains a response relating to a Web screen based on screen transition specifications selected from the additional screen transition specifications including an output item, according to the execution of the Web application, by giving a request that requests a Web screen based on the additional screen transition specifications to the Web application;
the extracting extracts an expected value for the additional screen transition specifications from the response based on the output item included in the response relating to the Web screen based on the obtained additional screen transition specifications; and
the writing writes the extracted expected value for the additional screen transition specifications, in connection with the additional screen transition specifications.

7. A test specifications creating apparatus that includes a computer processor and in communication with a Web server executing a Web application, the apparatus comprising:
receiving unit receiving unfinished test specifications data describing a series of screen transition specifications included in a test case for the Web application installed in the Web server;
obtaining unit obtaining a response including an output item, as result of the execution of the Web application, by transmitting a request requesting a Web screen, based on the screen transition specifications selected from the series of screen transition specifications, to the Web application;
extracting unit extracting an expected value for the screen transition specifications from the response based on the output item included in the response obtained by the obtaining unit; and
writing unit writing the extracted expected value to the received unfinished test specifications data in connection with the screen transition specifications.

8. A method of creating test specifications for a Web application installed on a Web server, comprising:
receiving unfinished test specifications data describing a series of screen transition specifications included in a test case for the Web application installed in the Web server;
transmitting a request requesting a Web screen, based on the screen transition specifications selected from the series of screen transition specifications, to the Web application;
obtaining a response including an output item as a result of execution of the Web application, based upon the transmitted request,
extracting an expected value for the screen transition specifications from the response based on the obtained output item included in the response; and
writing the extracted expected value to the received unfinished test specifications data in connection with the screen transition specifications.

9. A test specifications creating computer system, comprising:
- a Web server computer executing a Web application and transmitting a response including an output item according to a received request; and
- a client computer in communication with the Web server and
  - receiving unfinished test specifications data describing a series of screen transition specifications included in a test case for the Web application installed in the Web server;
  - transmitting to the Web application a request requesting a Web screen, based on the screen transition specifications selected from the series of screen transition specifications;
  - obtaining the response including the output item as a result of the execution of the Web application, based upon the transmitted request,
  - extracting an expected value for the screen transition specifications from the response based on the obtained output item included in the response; and
  - writing the extracted expected value to the received unfinished test specifications data in connection with the screen transition specifications.

* * * * *

UNITED STATES PATENT AND TRADEMARK OFFICE
CERTIFICATE OF CORRECTION

PATENT NO. : 8,095,913 B2  
APPLICATION NO. : 12/048828  
DATED : January 10, 2012  
INVENTOR(S) : Toshihiro Kodaka et al.

Page 1 of 1

It is certified that error appears in the above-identified patent and that said Letters Patent is hereby corrected as shown below:

First Page, Column 2 (Other Publications), Line 2, Delete "throrn" and insert -- thorn --, therefor.

Signed and Sealed this
Twenty-ninth Day of May, 2012

David J. Kappos
*Director of the United States Patent and Trademark Office*